United States Patent [19]

Friedman

[11] Patent Number: 5,414,526
[45] Date of Patent: May 9, 1995

[54] SYSTEM AND METHOD FOR ENCODING FACSIMILE DATA

[75] Inventor: Steven J. Friedman, Bellevue, Wash.

[73] Assignee: Microsoft Corp., Redmond, Wash.

[21] Appl. No.: 140,761

[22] Filed: Oct. 21, 1993

[51] Int. Cl.⁶ .............................................. H04N 1/415
[52] U.S. Cl. ................................ 358/426; 358/261.3; 358/261.4
[58] Field of Search ..................... 358/426, 261.3, 427, 358/432, 261.4; 382/56; 348/409, 414, 418; H04N 1/415

[56] References Cited

U.S. PATENT DOCUMENTS

| | | | |
|---|---|---|---|
| 4,799,110 | 1/1989 | Hisada et al. | 358/261.3 |
| 4,860,114 | 8/1989 | Horikawa et al. | 358/426 |
| 5,008,951 | 4/1991 | Koshi | 382/56 |
| 5,235,430 | 8/1993 | Takasu | 358/261.3 |
| 5,253,936 | 10/1993 | Ishida | 358/427 |
| 5,280,361 | 1/1994 | Ishikawa | 358/261.3 |
| 5,327,248 | 7/1994 | Milles et al. | 358/261.4 |
| 5,345,316 | 9/1994 | Ozaki et al. | 358/426 |

Primary Examiner—Edward L. Coles, Sr.
Assistant Examiner—Kim Yen Vu
Attorney, Agent, or Firm—Seed and Berry

[57] ABSTRACT

A system and method for facsimile data encoding uses vectors indicating the locations of changing elements along a horizontal scan line. The change vectors are stored in a vector table. The system may use a reference vector table and a coding vector table if CCITT recommendation T.6 two dimensional encoding is used. The system encodes horizontal scan lines using the vectors to determine the location of the changing elements. The value of the reference changing element is easily determined using the vector tables. The system determines the locations of all changing elements on a horizontal scan line before performing any encoding of that particular scan line thus simplifying the encoding process. The system can receive and decode facsimile data to generate change vectors. The change vectors provide a simple mechanism for regenerating the raw data. The change vectors are used to encode raw data into any standard facsimile encoding format, to decode facsimile data, and to interconvert from one encoding format to another without having to convert the encoded data back to raw data.

42 Claims, 12 Drawing Sheets

STATE TRANSITION TABLE

| Present State | Data Bits | | | |
|---|---|---|---|---|
| | 00 | 01 | 10 | 11 |
| 0 | 1 | 2 | 3 | 4 |
| 1 | 5 | 0 | 7 | 8 |
| 2 | 0 | 0 | 0 | 0 |
| 3 | 0 | 0 | 0 | 0 |
| 4 | | | | 0 |
| 5 | 9 | 10 | 0 | 0 |
| 6 | | | | |

FIG. 9

ACTION TABLE

| Present State | Data Bits | | | |
|---|---|---|---|---|
| | 00 | 01 | 10 | 11 |
| 0 | -- | -- | -- | -- |
| 1 | -- | P | -- | -- |
| 2 | $V_{L1}$ | $V_{L1}$ | $V_{R1}$ | $V_{R1}$ |
| 3 | $V_0$ | $V_0$ | $V_0, V_{L1}$ | $V_0, V_{R1}$ |
| 4 | | | | $V_0, V_0, V_0, V_0$ |
| 5 | -- | -- | $V_{L2}$ | $V_{R2}$ |
| 6 | | | | |

FIG. 10

SYSTEM AND METHOD FOR ENCODING FACSIMILE DATA

TECHNICAL FIELD

The present invention is directed to a system and method for encoding data, and more specifically, a system and method for encoding facsimile data.

BACKGROUND OF THE INVENTION

Facsimile (FAX) machines have long been used as a convenient system for transmitting data from one location to another. A transmitting FAX machine transmits a facsimile message over a telephone line to a receiving FAX machine. The telephone line may be a wire or optical cable, or may include a remote connection such as a microwave or satellite link. Thus, a user may send the facsimile message from one FAX machine to another FAX machine located anywhere in the world via the telephone line.

The cost of sending a facsimile message long distance includes the transmission cost of the telephone call which is directly related to the length of the message being sent and the time at which the facsimile telephone call is placed. To reduce costs, the user may send the facsimile message during low-cost periods, such as at night, when the demand for telephone lines is minimal. Thus, the phone rate is decreased and the cost of sending the facsimile message is correspondingly decreased.

The cost can also be reduced by minimizing the duration of the facsimile telephone call. One such method for minimizing the duration is to compress the data prior to transmission. Early facsimile machines used a basic data encoding technique, known as Modified Huffman (MH) encoding. This form of encoding permits compression of the facsimile message, with a corresponding decrease in the duration of the facsimile telephone call. Other data encoding techniques were developed for newer facsimile machines, although newer facsimile machines continue to retain MH encoding capability to enable facsimile communication with machines of the older design. A Modified Read (MR) encoding permits two-dimensional data encoding, which permits a higher degree of data compression than MH encoding. Both MH and MR encodings are described in standards established by the International Telegraph and Telephone Consultative Committee (CCITT) and published as *Terminal Equipment and Protocols for Telematic Services* (1989). The MH and MR data encodings are described in recommendation T.4 of the CCITT standard.

A third type of data compression is the Modified Modified Read (MMR encoding), which is described in recommendation T.6 of the CCITT standard and permits two-dimensional encoding of low- or high-resolution facsimile messages.

The techniques used for encoding a facsimile message using MH, MR, or MMR are described in the CCITT standard. References to the CCITT standards are made throughout this disclosure. The standards and the techniques used for MH, MR and MMR data encodings are well known to those skilled in the art and will not be discussed in detail.

When a facsimile telephone call is first initiated, the transmitting FAX machine does not know what data encoding capabilities the receiving FAX machine may have. Because of this, the facsimile message is not encoded using one of the above encoding techniques until after the facsimile telephone call is initiated and the data encoding capabilities of the receiving FAX machine are made known to the transmitting FAX machine. Encoding and hence transmission of the facsimile message does not occur until after the receiving FAX machine sends a digital identification signal (DIS) to the transmitting FAX machine. The DIS contains information indicating the data encoding capabilities of the receiving FAX machine. The transmitting FAX machine uses the information in the DIS to determine the appropriate data encoding format. As a result, the facsimile message is encoded during the facsimile telephone call.

A drawback of the data encoding algorithms described in the CCITT standard is that they are slow and require a longer duration facsimile telephone call. Therefore, it can be appreciated that there is a significant need for a system and method to improve facsimile data encoding and reduce facsimile transmission costs.

SUMMARY OF THE INVENTION

The present invention is embodied in a system for encoding facsimile data in a first facsimile machine containing a data file storage area which contains a raw data file to be encoded according to a plurality of predetermined standard encoding formats. The raw data file comprises a series of horizontal scan lines, each having first and second ends, each of the horizontal scan lines comprising a plurality of pixels having first and second logic states. A generator analyzes the horizontal scan lines and determines positions on the horizontal scan lines relative to the first end where the pixels change from the first logic state to the second logic state and from the second logic state to the first logic state. A storage table coupled to the generator receives the position information for a single one of the horizontal scan lines. An index pointer points to a location within the storage table. An analyzer analyzes a scan line by analyzing entries in the storage table. The analyzer generates compressed data for the scan line using a plurality of standard predetermined codes to encode the scan line according to the predetermined standard encoding format. A compressed data file storage area receives the compressed data and temporarily stores it. A facsimile interface sequentially receives the stored compressed data and generates standard predetermined electrical signals representative of compressed data.

The system can decode facsimile data which has already been encoded according to a predetermined standard format where the decoded facsimile data comprises a series of horizontal scan lines, each of the scan lines comprising a plurality of pixels having first and second logic states. The encoded facsimile data is stored in an encoded data storage area. The system includes means for retrieving a portion of the encoded data from the encoded data storage area for analysis. A data table has a first index indicating a current decoding position and a second index having values that correspond to the portion of the encoded data. The data table contains values indicating a next decoding position and a decoding action to be performed by the system. An analyzer receives the encoded data portion and uses the data table to determine the next decoding position and the decoding action. The analyzer generates a plurality of change vectors indicating positions on the horizontal scan lines where the pixels change from the first logic state to the second logic state and from the second logic state to the first logic state. The change vectors for the horizontal scan lines are stored in a change vector storage area.

The system further includes means for conversion from one predetermined standard encoding format to another one of the plurality of predetermined standard encoding formats. In one embodiment, the predetermined encoding standard format is defined by CCITT standard T.6 two-dimensional facsimile encoding standard. In another embodiment the predetermined encoding standard format is defined by CCITT standard T.4 two-dimensional facsimile encoding standard. The plurality of predetermined standard encoding formats may comprise MH encoding, MR encoding, and MMR encoding.

In one embodiment, the system has a reference storage table and a coding storage table, each with separate indexes and storing position information for a reference horizontal scan line and a coding horizontal scan line. The analyzer performs two-dimensional coding by analyzing entries within the reference table and the coding table to encode the scan line.

BRIEF DESCRIPTION OF THE DRAWINGS

FIG. 9 is a state transition data table used by the decoding portion of the system of FIG. 2.

FIG. 10 is an action data table used by the decoding portion of the system of FIG. 2.

DETAILED DESCRIPTION OF THE INVENTION

The present invention describes a system and method for encoding a data file such that the data will conform to the CCITT standards for MH, MR, or MMR encoding.

Figure 1:
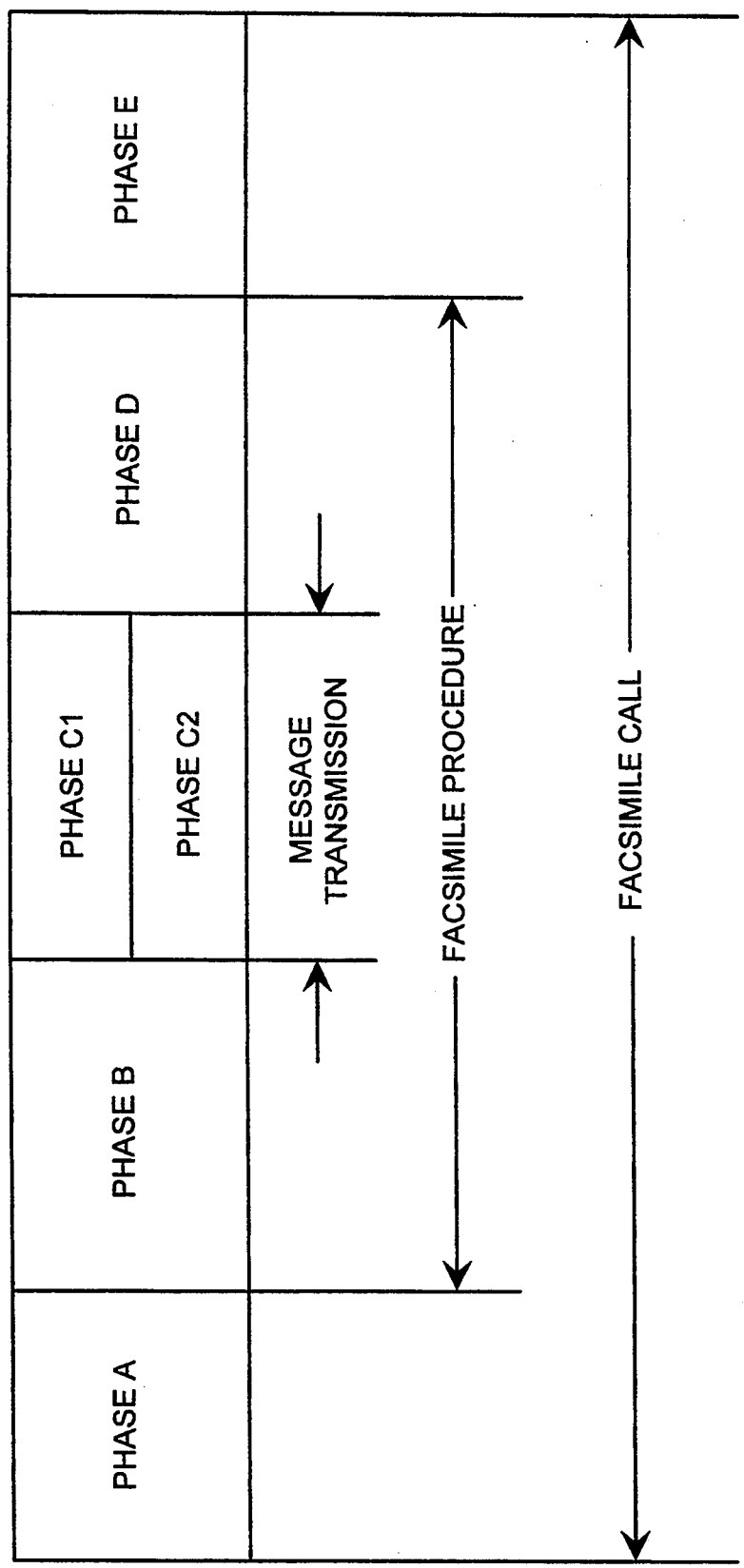
FIG. 1 illustrates the various standard phases of operation of the conventional FAX machine.

As discussed above, the facsimile data encoding capabilities of a receiving FAX machine are transmitted to a transmitting FAX machine by the DIS during what may be termed a negotiation phase. The various phases of facsimile transmission, shown in FIG. 1, are described in the CCITT standards. Phase A is the call establishment phase in which the telephonic communication is established between a calling station and a called station. The calling station is the station initiating the facsimile telephone call and the called station is the station receiving the facsimile telephone call. As is well known, both the calling station and the called station are able to transmit or receive facsimile messages.

Phase B is a pre-message procedure phase or a negotiation phase for identifying and selecting facsimile data encoding capabilities between the calling station and the called station. Whichever station is to receive the facsimile message will transmit the DIS data frame. The individual data bits of the DIS data frame identify particular facsimile data processing modes of the receiving FAX machine. As previously discussed, the capabilities include data encoding such as MH, MR, and MMR.

Phase C is the actual message transfer phase and comprises two simultaneous phases. Phase C1 is the "In-message" procedure phase, which controls the transfer of data between the transmitting FAX machine and the receiving FAX machine. This includes synchronization, error detection and correction, and line supervision. Phase C2 is the actual data transmission phase in which encoded data is transferred by the transmitting FAX machine to the receiving FAX machine under control of the signals generated in the C1 phase.

Phase D is the post-message procedure phase in which information is transferred regarding the end-of-message signaling, confirmation signaling, and end-of-facsimile signaling. Phase E is the call-release phase in which the telephonic communication between the calling station and the called station is terminated.

The transmitting FAX machine is not aware of the data encoding capabilities of the receiving FAX machine until it receives the DIS data frame in Phase B. Thus, the transmitting FAX machine must encode the data file using the most efficient data encoding capability available on the receiving FAX machine while the facsimile telephone call is in progress.

The present invention permits faster encoding of the data file using a change vector approach to data encoding. The encoded data conforms in every way to the CCITT standard, thus permitting the present invention to send facsimile messages to both a FAX machine of the same design, or a prior art FAX machine. The present invention also provides a mechanism for interconverting from one data encoding format to another without converting coded data back to raw data.

Figure 2:
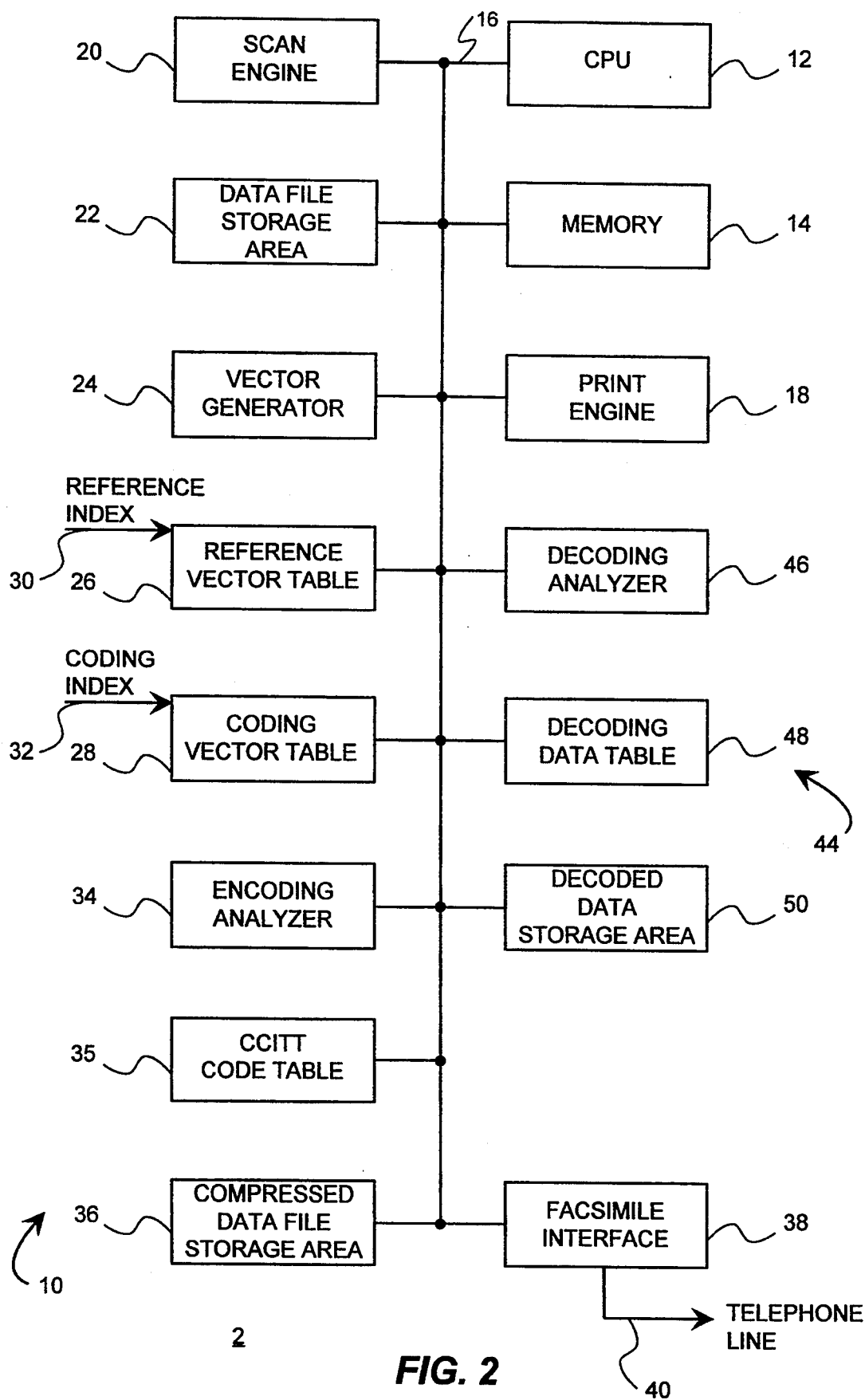
FIG. 2 is a functional block diagram of the system according to the present invention.

The present invention is embodied in a system 2 within the transmitting FAX machine, shown in block diagram form in FIG. 2. The system 10 contains a central processing unit (CPU) 12 and a memory 14, which may comprise both random access memory (RAM) and read only memory (ROM). The CPU 12 is coupled to the memory 14 by a computer bus 16 which may distribute electrical power as well as data signals. Also coupled to the computer bus 16 is a print engine 18. If the FAX machine is a facsimile interface board in a computer, as is common, the print engine 18 may be an external printer coupled to the computer.

A scan engine 20 is also coupled to the computer bus 16. The scan engine 20 scans a paper document page by page and converts it into a series of horizontal scan lines having 1,728 horizontal pixels. There are either 1,100 or 2,200 horizontal scan lines per page, depending on the vertical resolution of the system 10. The output of the scan engine 20 is a raw data file, which may be stored in a data file storage area 22 coupled to the computer bus 16. The data file storage area 22 may be part of the memory 14. Alternatively, the facsimile message may already be in electronic form, such as would occur if the user composes an electronic facsimile message using a word processor. The raw data, whether created by the scan engine 20 or by the user in electronic form, is stored in the data file storage area 22.

An encoding portion 10 of the system 2 contains a vector generator 24 coupled to the computer bus 16 to analyze a horizontal scan line and determines the location of changing elements relative to the left edge of the horizontal scan line. As defined by CCITT standard, a changing element refers to a pixel on a horizontal scan line that changes from black to white or from white to black. The white and black pixels are generally defined in the raw data file storage area 22 by first and second logic states, respectively. The vector generator 24 determines the position of each changing element on a horizontal scan line by analyzing the logic state of all pixels on a horizontal scan line and noting the position on the horizontal scan line at which the logic state changes. The vector generator 24 stores this position information in a table. A "change vector", as used herein, means the position of a changing element on a horizontal scan line with respect to one end of the horizontal scan line. Encoding a horizontal scan line using change vectors simplifies the data encoding process because the scan line data is preserved in a format that permits simplified access by encoding algorithms. For MMR encoding, the system stores a set of reference change vectors for a reference horizontal scan line within a reference vector table 26 and a set of coding change vectors for a coding horizontal scan line in a coding vector table 28 coupled to the computer bus 16. As defined by the CCITT standard, the coding horizontal scan line is the horizontal scan line immediately below the reference horizontal scan line. A reference index or pointer 30 points to a particular location within the reference vector table 26 while a coding index or pointer 32 points to a particular location within the coding vector table 28.

An analyzer 34 uses the change vectors in the reference vector table 26 and the coding vector table 28 to encode the coding horizontal scan line. The analyzer 34 specifies a plurality of CCITT standard codes corresponding to pass mode coding, horizontal mode coding, and vertical mode coding as described in the CCITT standard. The CCITT standard codes for pass mode coding, horizontal mode coding, and vertical mode coding are stored with a CCITT code storage table 35. Thus, the system 10 generates the exact same codes for a page of data that would be generated by the slower, less efficient prior art systems. This allows complete compatibility with FAX machines of prior an design. The use of the reference vector table 26 and coding vector table 28 by the analyzer 34 is discussed in detail below.

The CCITT standard codes specified by the analyzer 34 are temporarily stored within a compressed data file storage area 36. The compressed data file storage area 36 may be part of the memory 14. A facsimile interface 38 coupled to the computer bus 16 receives the CCITT standard codes stored in the compressed data file storage area 36 and transmits them over a telephone line 40 to a receiving FAX machine (not shown).

The system 10 also provides decoding capability for received facsimile data. This decoding capability may be used to decode a received facsimile message or to interconvert encoded facsimile data from one encoding format to another. For example, the system 10 can convert from MMR encoded data to MH encoded data without converting the encoded data back into raw data as is required by systems of the prior art. This permits faster interconversion of encoded facsimile data. A decoding portion 44 of the system 2 contains a decoding analyzer 46 that analyzes encoded data. The encoded data may be stored in the compressed data file storage area 36 or the memory 14. The decoding analyzer 46 uses a decoding data table 48 to decode the data and generate change vectors based on data entries in the decoding data table. The change vectors are stored in a decoded data storage area 50, which may be part of the memory 14. Alternatively, the change vectors may be stored in the vector tables 26 and 28. The change vectors generated by the decoding analyzer 46 are used to regenerate raw data. The raw data is temporarily stored in the data file storage area 22 and printed on the print engine 18. Thus, the system 2 provides encoding and decoding capability with encoded data that corresponds to the CCITT standards. This permits the system 2 to communicate with prior art FAX machines as well as FAX machine of the same design.

As noted above, the prior art MMR data encoding scheme for two-dimensional encoding is described within recommendation T.6 of the CCITT standard. To aid in the understanding of the present invention, the prior art technique for MMR encoding (also known as T.6 encoding) will be briefly described. With CCITT standard T.6 encoding, one horizontal scan line is designated as a reference line and the next subsequent horizontal scan line is designated as a coding line. At the top of a page an imaginary all-white line is designated as the reference line and the first horizontal line of data is designated as the coding line. A reference or starting changing element on each coding line is designated as $a_0$. At the start of the coding line, $a_0$ is set on an imaginary white changing element situated just before the first pixel on the coding line. During the coding of the coding line, the position of $a_0$ is defined by the previous coding mode. The next changing element to the right of $a_0$ is designated as $a_1$. The next changing element to the right of $a_1$ is designated as $a_2$. The first changing element on the reference line to the right $a_0$ and of the opposite color to $a_0$ is designated as $b_1$. The next changing element to the right of $b_1$ on the reference line is designated as $b_2$.

The CCITT standard specifics three possible coding modes, a pass mode, a vertical mode, and a horizontal mode. The prior art encoding scheme begins by analyzing the position of the changing elements $a_0$, $a_1$, and $a_2$, with respect to the reference changing element $b_1$ and $b_2$. The various coding modes are used depending on these interrelationships. In the prior art, the changing elements $a_1$, $a_2$, $b_1$, and $b_2$ are determined only after the position of the reference changing element $a_0$ is defined. This requires that the reference line and the coding line be analyzed after the location of $a_0$ is determined. Each time, the reference changing element $a_0$ is relocated, the prior art systems must analyze the raw data and recalculate the position of the changing elements $a_1$, $a_2$, $b_1$, and $b_2$. The prior art process of determining the location of the various changing elements with respect to the reference changing element $a_0$ is a tedious and a time-consuming process, resulting in an inefficient data encoding procedure.

In contrast, the system and method of the present invention analyzes a coding line only one time and determines the location of each changing element within the coding line. The position of the changing elements within the coding line are defined herein as change vectors. That is, a particular change vector points to the position along a horizontal line with respect to the beginning of the line where an element changes from black to white, or white to black. The change vectors for the coding line, which are defined herein as coding change vectors, are stored within the coding vector table 28 (see FIG. 2). As with the prior art, when coding of the coding line is completed, that coding line subsequently becomes the reference line for the next horizontal scan line. Upon completion of coding of the coding line, the coding change vectors within the coding vector table 28 are subsequently used as change vectors for the reference line when coding the next subsequent horizontal scan line. The creation of the reference and coding vector tables 26 and 28 permits the encoding portion 10 of the system 2 to efficiently analyze and encode data without requiring the continuous recalculation of the changing elements $a_1$, $a_2$, $b_1$, and $b_2$ with respect to the reference changing element $a_0$. The encoding portion 10 calculates the location of these changing elements using the reference vector table 26 and the coding vector table 28 which is more efficient than repeatedly analyzing the raw data.

The use of the encoding portion 10 to encode raw data is illustrated in the flowcharts of FIGS. 3A–3E. FIGS. 3A–3E illustrate coding procedure for two-dimensional coding specified in the T.6 portion of the CCITT standard. In step 100, shown in FIG. 3A, the first line of a page is assumed to be an all white reference line (i.e., no black changing elements). In step 102, the system determines the change vectors for the coding line, which is the next subsequent horizontal scan line below the reference line. The change vectors can be determined by examining the logic state of the pixels in the coding line stored in the data file storage area 22. The CCITT standard defines an imaginary white pixel on each horizontal scan line immediately to the left of the first actual pixel. In step 104, the encoding portion 10 stores the coding change vectors in the coding vector table 28 (see FIG. 2). Thus, all coding change vectors are determined and stored within the coding vector table 28 before any determination of the reference changing element or other changing elements on the coding line, or changing elements on the reference line.

The encoding portion 10 initializes the coding index 32 (see FIG. 2) and the reference index 30 in step 106. Initializing the coding index and the reference index permits the encoding portion 10 to make the initial determination of the reference changing element, as defined in the CCITT standard, and of other changing elements relative to the reference changing element. In step 108, the encoding portion 10 defines the changing elements in terms of change vectors. The reference changing element is defined as coding change vector $V_{C1}$ and is assigned the value of the location in the coding vector table 28 pointed to by the coding index 32, which is designated herein as CodIndex. As used herein, the use of parenthesis around a variable refers to the contents of the location pointed to by the variable. Thus, the term $V_{C1}$=(CodIndex) means that $V_{C1}$ is given the value contained within the storage location of the coding vector table 28 pointed to by CodIndex. Similarly, the next changing element on the coding line is designated coding change vector $V_{C2}$ and is initially assigned a value indicated by the contents of the coding vector table 28 at the location CodIndex+1. The next changing element on the coding line is designated coding change vector $V_{C3}$ and is assigned a value indicated by the contents of the coding vector table 28 at the location CodIndex+2. The first changing element on the reference line to the right of $V_{C1}$ is designated as reference change vector $V_{R1}$ and is assigned the value contained within the reference coding table 26 (see FIG. 2) at the location pointed to by the reference index 30, which is designated herein as RefIndex. The next changing element to the right of $V_{R1}$ is designated as reference change vector $V_{R2}$ and is assigned the value in the location pointed to by RefIndex+1.

Figure 3A:
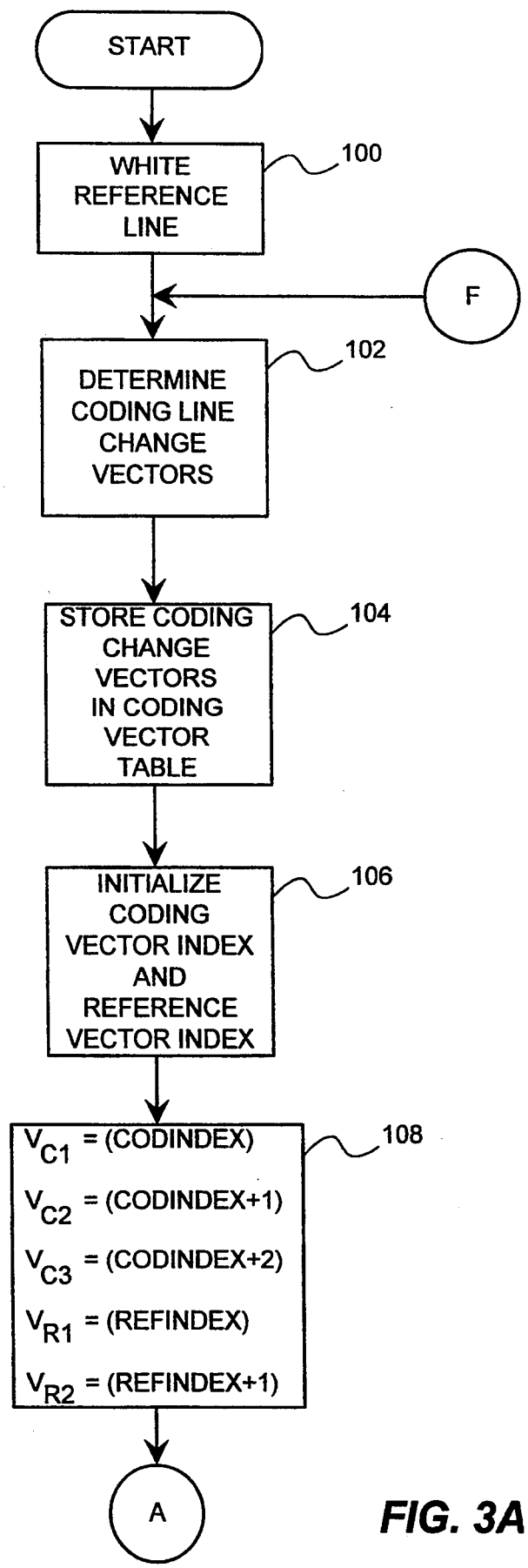
FIGS. 3A to 3E are flowcharts of the operation of the system of FIG. 2.
Figure 3B:
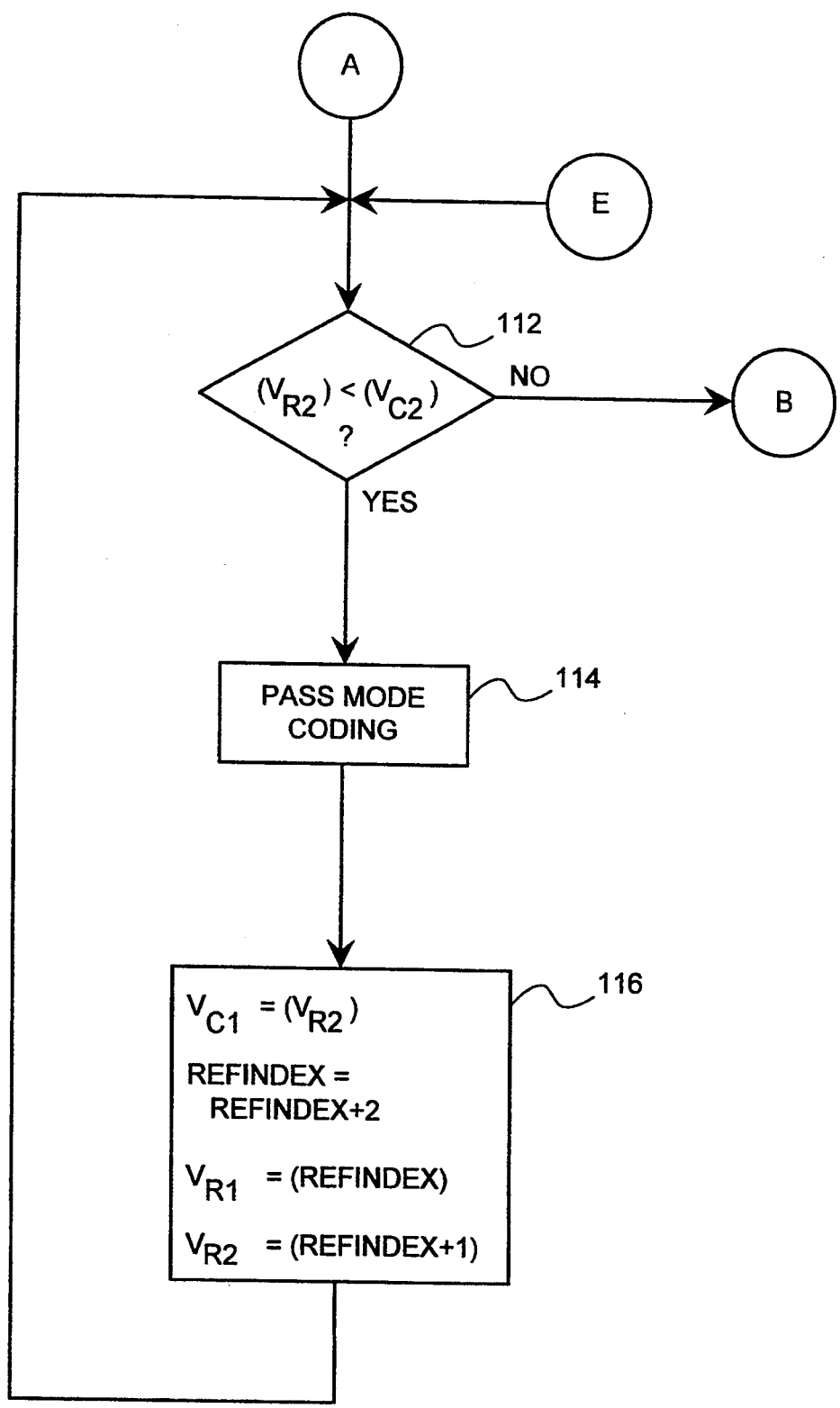

In decision 112, shown in FIG. 3B, the encoding portion 10 of the system 2 compares the value of $V_{R2}$ with the value of $V_{C2}$. If the value of $V_{R2}$ is less than the value of $V_{C2}$, the result of decision 112 is YES and the system 10 will use pass mode coding in step 114.

Figure 4:
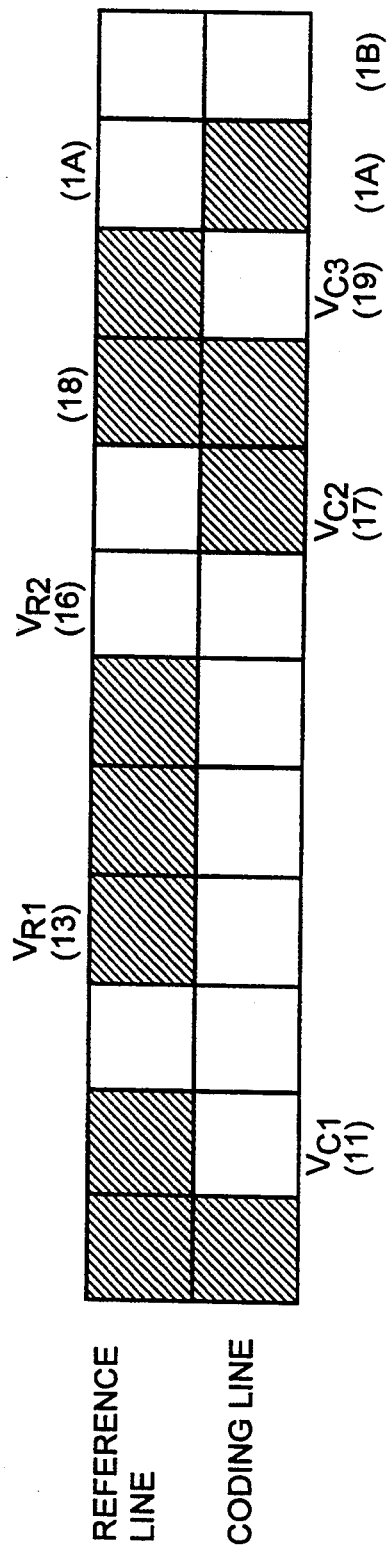
FIG. 4 illustrates the use of the present invention in pass mode coding.

The use of pass mode coding by the encoding portion 10 in FIG. 3B may be better understood with an example of FIG. 4 using the data shown in Table 1 below for the reference vector table 26 and the coding vector table 28.

TABLE 1

| REF. VECTOR TABLE | | CODING VECTOR TABLE | |
| --- | --- | --- | --- |
| REFINDEX→ | 13 | CODINDEX→ | 11 |
| | 16 | | 17 |
| | 18 | | 19 |
| | 1A | | 1A |
| | | | 1B |

The values contained within the reference vector table 26 and the coding vector table 28 are 16-bit values, which provides adequate resolution to identify each element on a 1,728 horizontal pixel scan line and permits the storage of words of data within the vector tables 26 and 28. The numbers in Table 1 are selected merely to provide an example of pass mode coding. Note that the value of $V_{R2}$ may be easily compared with the value of $V_{C2}$ in step 112 of FIG. 3B by comparing the contents of the reference vector table 36 and the coding vector table 28 at locations RefIndex+1, and CodIndex+1, respectively. In the example shown in FIG. 4 and in Table 1, the value of $V_{R2}$ (16) is less than the value of $V_{C2}$(17), indicating that a pass mode coding is appropriate. The CCITT standard code for pass mode is stored within the compressed data file storage area 36 (see FIG. 2). The CCITT standard binary code for the pass mode is 0001.

In step 116 of FIG. 3B, the encoding portion 10 assigns to the reference changing vector $V_{C1}$, the value $V_{R2}$. The reference index 30 (see FIG. 2) is incremented by a value of 2, and the reference changing vector $V_{R1}$ and $V_{R2}$ are assigned values contained in the reference vector table 28 at the location pointed to by RefIndex, and RefIndex+1. respectively. With respect to the example of FIG. 4 and the contents of Table 1 above. $V_{C1}$ is given a value of 16 in step 116 of FIG. 3B. This value corresponds to the value of $V_{R2}$. RefIndex is incremented by 2, thus pointing to a location in the reference vector table 26 containing the value 18. The value 18 is subsequently assigned to the reference change vector $V_{R1}$, and the value 1A contained in the reference vector table 26 at a location RefIndex+1, is assigned to the reference change vector $V_{R2}$. Thus, the system has completed a single "coding pass," which encodes a portion of the coding line with respect to the reference line. It should be noted that the coding change vectors $V_{C2}$ and $V_{C3}$ do not change as a result of pass mode coding, therefore, there is no change to the coding index 32. Following the assignment of new values for the reference index 30 and the reference change vectors $V_{R1}$ and $V_{R2}$ in step 116, the system 10 returns to decision 112 to again compare the value of $V_{R2}$ with the value of $V_{C2}$.

Figure 3C:
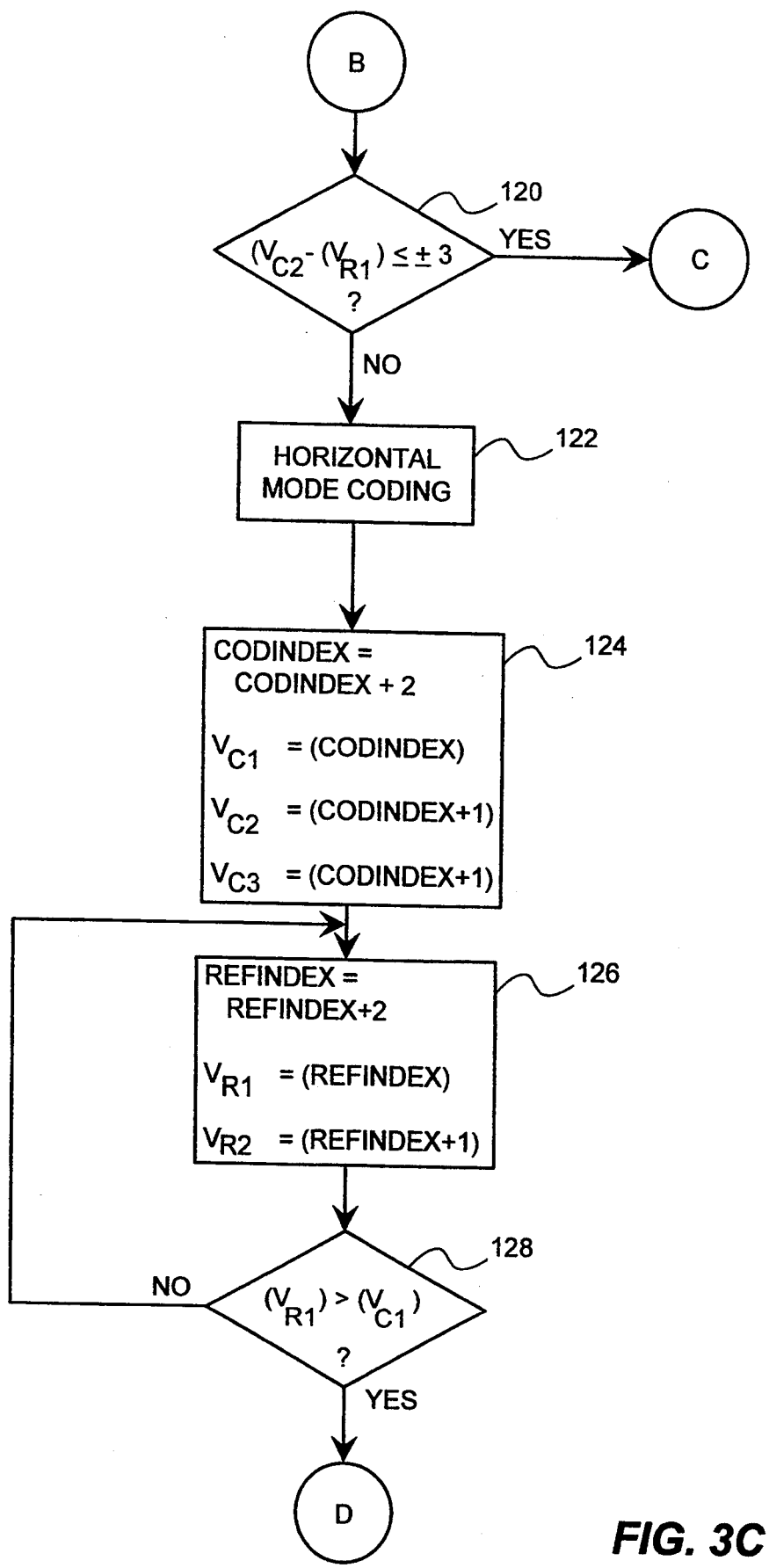
Figure 3D:
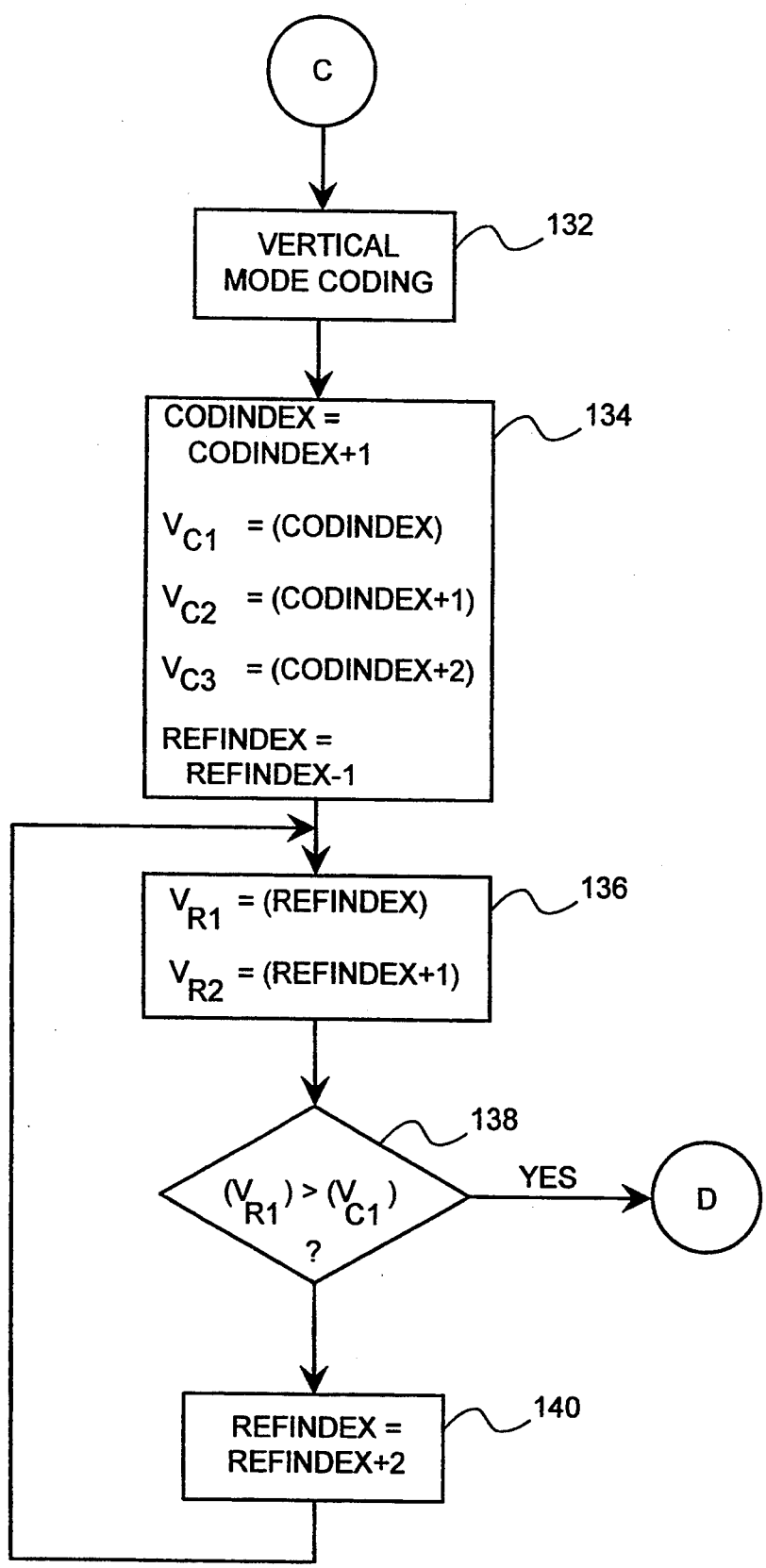

If the value of $V_{R2}$ is greater than the value of $V_{C2}$, the result of decision 112 is NO, and in decision 120, shown in FIG. 3C, the encoding portion 10 determines whether the value of $V_{C2}$ minus the value of $V_{R1}$ is less than or equal to ±3. In other words, the encoding portion 10 determines whether the location of $V_{C2}$ is within 3 pixels of the location of $V_{R1}$. While step 120 illustrates this determination by subtracting the value of $V_{R1}$ from the value of $V_{C2}$, there are numerous well-known methods for determining whether $V_{C2}$ is within 3 pixels of $V_{R1}$. If $V_{C2}$ is not within 3 pixels of $V_{R1}$, the result of decision 120 is NO. In that event, the encoding portion 10 enters a horizontal mode coding sequence in step 122.

Figure 5:
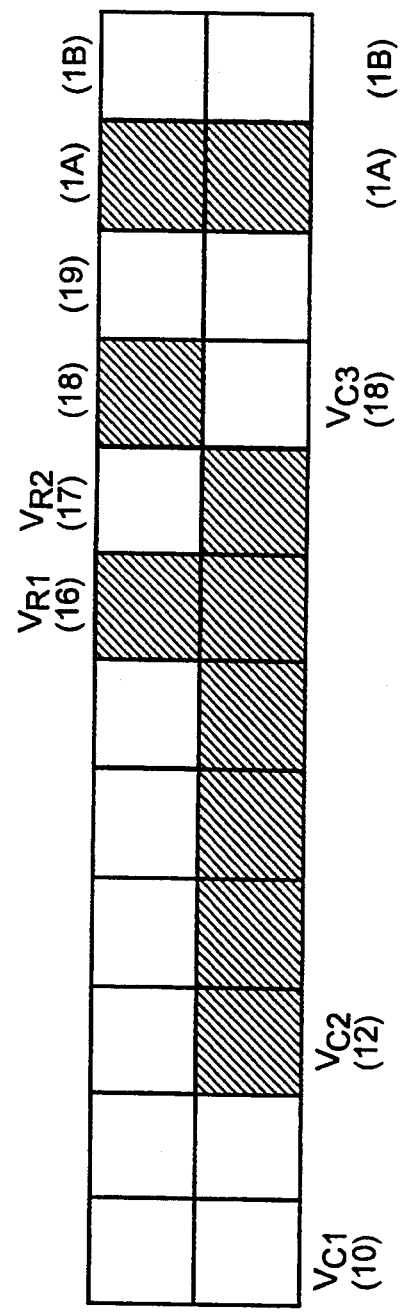
FIG. 5 illustrates the use of the present invention in horizontal mode coding.

The use of horizontal mode coding by the encoding portion 10 may be better understood with an example of FIG. 5 using the sample data shown in Table 2 below for the reference vector table 26 (see FIG. 2) and the coding vector table 28.

TABLE 2

| REF. VECTOR TABLE | | CODING VECTOR TABLE | |
|---|---|---|---|
| REFINDEX → | 16 | CODINDEX→ | 10 |
| | 17 | | 12 |
| | 18 | | 18 |
| | 19 | | 1A |
| | 1A | | 1B |

The coding change vector, $V_{C1}$, has a value of 10 as indicated by the contents of the coding vector table 28 at the location pointed to by the coding index 32. Coding change vectors $V_{C2}$ and $V_{C3}$ have values of 12 and 18, as indicated by the contents of the coding vector table 28 at the locations pointed to by CodIndex+1, and CodIndex+2, respectively. The reference change vector $V_{R1}$ is assigned a value of 16, as indicated by the reference vector table 26 at the location pointed to by the reference index 30. The reference change vector $V_{R2}$ is assigned a value of 17, as indicated by the contents of the reference vector table 26 at the location RefIndex+1. A simple comparison of the value of coding change vector $V_{C2}$ with respect to the value of reference change vector $V_{R1}$ indicates that $V_{C2}$ is not within 3 pixels of $V_{R1}$, thus indicating horizontal mode coding. The CCITT standard binary code of 001 is inserted within the compressed data file storage area 36 (see FIG. 2) to indicate horizontal mode coding, followed by two separate codes indicating the white run length or black run length between $V_{C1}$ and $V_{C2}$, followed by another code word indicating the black run length or white run length between $V_{C2}$ and $V_{C3}$. In the example of FIG. 5, there is a run of two white elements between $V_{C1}$ and $V_{C2}$, followed by a run of six black elements between $V_{C2}$ and $V_{C3}$. The CCITT standard binary codes of 0111 and 0010 are used to indicate the white and black runs, respectively.

Following the horizontal mode coding in step 122, the encoding portion 10 increments the CodIndex by 2 in step 124 of FIG. 3C. The coding change vector $V_{C1}$ is redesignated to have a value contained within the coding vector table 28 (see FIG. 2) at the location pointed to by the coding index 32. Similarly, the coding change vectors $V_{C2}$ and $V_{C3}$ are assigned values contained within the coding vector table 28 at locations CodIndex+1, and CodIndex+2, respectively.

In step 126, the reference index 30 is incremented by a value of 2. Reference change vector $V_{R1}$ is redesignated to have a value contained within the reference vector table at the location pointed to by the reference index, and the reference change vector $V_{R2}$ is assigned to value contained in the reference vector table 26 at the location RefIndex+1. In decision 128, the encoding portion 10 determines whether the value of the reference change vector $V_{R1}$ is greater than the value of the coding change vector $V_{C1}$. If the value of the reference change vector $V_{R1}$ is not greater than the value of the coding change vector $V_{C1}$, the result of decision 128 is NO and the system returns to step 126 to increment the reference index 30 by 2 again. This continues until the value of the reference change vector $V_{R1}$ is greater than the value of the coding change vector $V_{C1}$, indicating that the location of the reference change vector $V_{R1}$ is now to the right of the coding change vector $V_{C1}$. If the value of the reference change vector $V_{R1}$ is greater than the value of the coding change vector $V_{C1}$, the result of decision 128 is YES, and the horizontal mode coding pass is completed. Alternatively, the reference vector $V_{R2}$ could be assigned the value contained in the reference vector table 26 at location RefIndex+1 after the YES decision in decision 128 instead of in step 126. This is more efficient because the step of assigning a new value to the reference vector $V_{R2}$ is outside the loop formed by step 126 and decision 128.

If the value of coding change vector $V_{C2}$ is within 3 pixels of the value of the reference change vector $V_{R1}$, the result of decision 120 is YES. In that event, the encoding portion 10 enters a vertical coding mode shown in step 132 of FIG. 3D. In vertical coding mode, the CCITT standard provides separate codes indicating the relative position of the coding change vector $V_{C2}$ with respect to the reference change vector $V_{R1}$. An example of vertical coding mode is shown in FIG. 6, which uses the sample data shown in Table 3 below for the reference vector table 26 (see FIG. 2) and coding vector table 28.

TABLE 3

| REF. VECTOR TABLE | | CODING VECTOR TABLE | |
|---|---|---|---|
| | 14 | CODINDEX→ | 10 |
| REFINDEX→ | 15 | | 12 |
| | 18 | | 13 |
| | 1A | | 15 |
| | 1B | | 17 |

Figure 6:
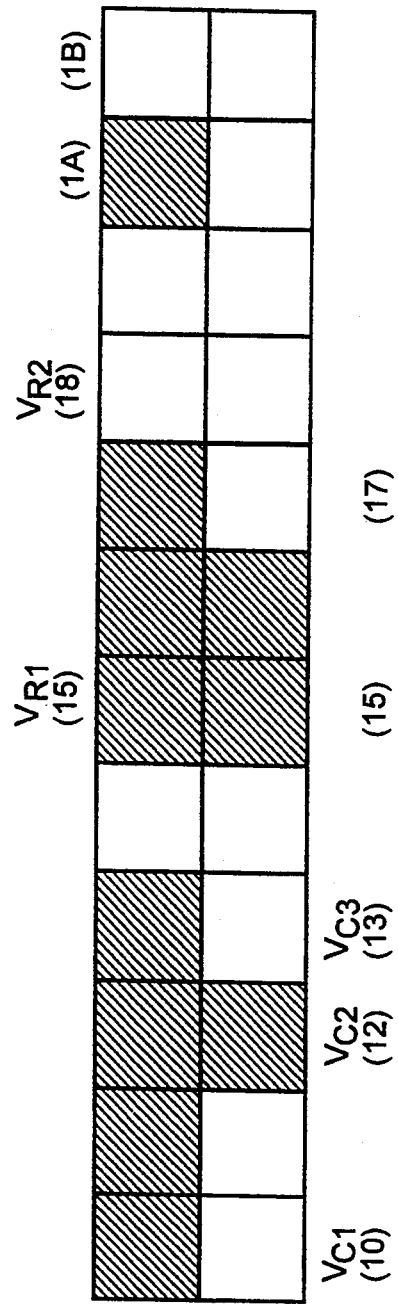
FIG. 6 illustrates the use of the present invention in vertical mode coding.

In the example of FIG. 6 and the data of Table 3 above, it can readily be determined that coding change vector $V_{C2}$ is three pixels to the left of reference change vector $V_{R1}$. Therefore, the encoding portion 10 of the system 2 will insert the CCITT standard binary code 0000010 in the compressed data file storage area 36 (see FIG. 2) to indicate that the first changing element ($a_1$) to the right of the reference changing element ($a_0$) is three pixels to the left of the first changing element ($b_1$) on the reference coding line.

Following the vertical coding mode in step 132, the encoding portion 10 increments the coding index 32 by 1 in step 134. The coding change vector $V_{C1}$ is assigned a value contained within the coding vector table 28 at the location pointed to by the coding index 32. Similarly, coding change vectors $V_{C2}$ and $V_{C3}$ are assigned values contained within the coding vector table 28 at location s pointed to by CodIndex+1, and CodIndex+2, respectively. The reference index 30 is decremented by a value of 1 in step 134. In step 136, the encoding portion 10 assigns to the reference change vector $V_{R1}$ the value contained in the reference vector table 26 at the location pointed to by the reference index 30. The reference change vector $V_{R2}$ is assigned the value contained in the reference vector table 26 at the location pointed to by RefIndex+1. Alternatively, a new value for reference change vector $V_{R2}$ could be assigned outside the loop formed by step 136, decision 138, and step 140.

In decision 138, the encoding portion 10 determines whether the value of the reference change vector $V_{R1}$ is greater than the value of the coding change vector $V_{C1}$. If the value of the reference change vector $V_{R1}$ is not greater than the value of the coding change vector $V_{C1}$, the result of decision 138 is NO, and in step 140, the encoding portion 10 increments the reference index 30 by a value of 2. The system then retests to determine whether the value of the reference change vector $V_{R1}$ is greater than the value of the coding change vector $V_{C2}$. This continues until the value of the reference change vector $V_{R1}$ is greater than the value of the coding change vector $V_{C1}$. In that event, the result of decision 138 is YES and the system has completed a vertical coding mode pass.

In the example of FIG. 6 and the data of Table 3 above, incrementing the coding index 32 in step 134 (see FIG. 3D) causes CodIndex to point to the next subsequent location in the coding vector table 28. Assigning new values to the coding change vectors results in coding change vectors $V_{C1}$, $V_{C2}$, and $V_{C3}$ having the values of 12, 13, and 15, respectively. Decrementing the reference index 30 causes RefIndex to point to the previous location in the reference vector table 28. In step 136 the reference change vector $V_{R1}$ is assigned the value contained in the reference vector table 26 at the location pointed to by the reference index 30. The reference change vector $V_{R2}$ is assigned the value contained in the reference vector table 26 at the location pointed to by RefIndex+1. As previously discussed, the encoding portion 10 could assign a new value to the reference change vector $V_{R2}$ outside the loop formed by step 136, decision 138, and step 140. This may result in even greater computational efficiency.

In decision 138, the new value of the reference change vector $V_{R1}$ is compared to the new value of the coding change vector $V_{C1}$. In this example, the location of the reference change vector $V_{R1}$ is to the right of the location of the coding change vector $V_{C1}$ as can readily be determined by comparing the value of the reference change vector $V_{R1}$ (i.e., 14) to the value of the coding change vector $V_{C1}$ (i.e., 12). Therefore, the value of the reference change vector $V_{R1}$ is greater than the value of the coding change vector $V_{C1}$, and the result of decision 138 is YES.

Figure 7:
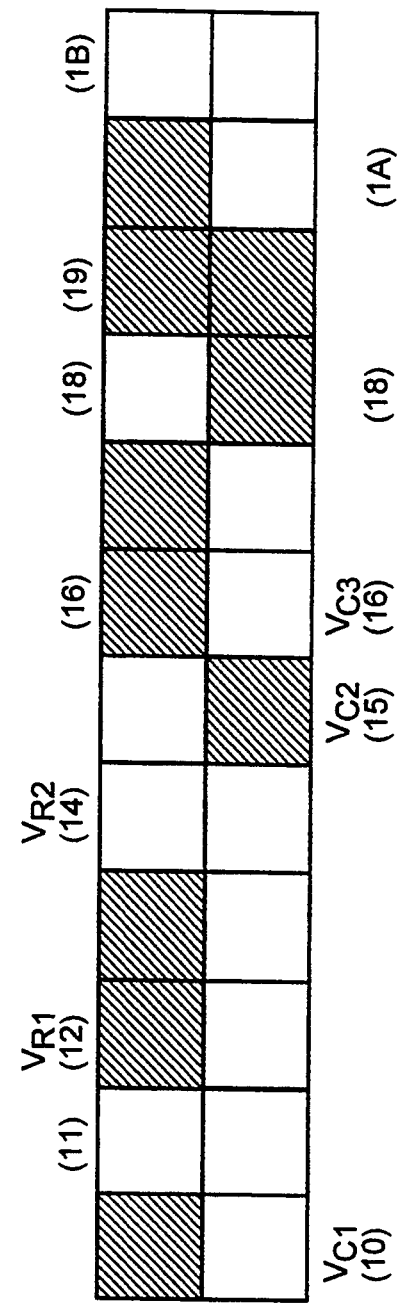
FIG. 7 illustrates the use of the present invention with another example of vertical mode coding.

Another example of the vertical mode coding is shown in FIG. 7, which uses the data shown in Table 4 below.

TABLE 4

| REF. VECTOR TABLE | | CODING VECTOR TABLE | |
|---|---|---|---|
| | 11 | CODINDEX→ | 10 |
| REFINDEX→ | 12 | | 15 |
| | 14 | | 16 |
| | 16 | | 18 |
| | 18 | | 1A |
| | 19 | | |
| | 1B | | |

In this example, the coding change vector $V_{C2}$ is three pixels to the right of the reference change vector $V_{R1}$. Therefore, the result of decision 120 in FIG. 3C is YES, and the encoding portion 10 performs the vertical mode coding in step 132 of FIG. 3D. The encoding portion 10 inserts the CCITT standard binary code 0000011 in the compressed data file storage area 36 (see FIG. 2) to indicate that the first changing element ($a_1$) to the right of the reference changing element ($a_0$) is three pixels to the right of the first changing element ($b_1$) on the reference coding line.

In the example of FIG. 7 and the data of Table 4 above, incrementing the coding index 32 in step 134 (see FIG. 3D) causes CodIndex to point to the next subsequent location in the coding vector table 28. Assigning new values to the coding vectors results in coding change vectors $V_{C1}$, $V_{C2}$, and $V_{C3}$ having the values of 15, 16, and 18, respectively. Decrementing the reference index 30 causes RefIndex to point to the previous location in the reference vector table 28. In step 136 the reference change vector $V_{R1}$ is assigned the value contained in the reference vector table 26 at the location pointed to by the reference index 30. The reference change vector $V_{R2}$ is assigned the value contained in the reference vector table 26 at the location pointed to by RefIndex+1. In decision 138, the value of the reference change vector $V_{R1}$ is compared to the value of the coding change vector $V_{C1}$. In this example, the location of the reference change vector $V_{R1}$ is to the left of the location of the coding change vector $V_{C1}$ as can readily be determined by comparing the value of the reference change vector $V_{R1}$ (11) to the value of the coding change vector $V_{C1}$ (i.e., 15). Therefore, the value of the reference change vector $V_{R1}$ is not greater than the value of the coding change vector $V_{C1}$, and the result of decision 138 is NO. In step 140 the encoding portion 10 increments the reference index 30 by a value of two causing RefIndex to point to the location in the reference vector table 26 containing the value 14.

Following step 140, the encoding portion 10 returns to step 136 to assign new values to the reference change vectors $V_{R1}$ and $V_{R2}$, and then to decision 138 to again compare the value of the reference change vector $V_{R1}$ to the value of the coding change vector $V_{C1}$. In this example, the location of the reference change vector $V_{R1}$ is still to the left of the location of the coding change vector $V_{C1}$ as can readily be determined by comparing the value of the reference change vector $V_{R1}$ (i.e., 14) to the value of the coding change vector $V_{C1}$ (i.e., 15). Therefore, the value of the reference change vector $V_{R1}$ is not greater than the value of the coding change vector $V_{C1}$, and the result of decision 138 is NO. The encoding portion 10 again increments the reference index 30 by a value of two in step 140, causing RefIndex to point to the location in the reference vector table 26 containing the value 16. This time the value of the reference change vector $V_{R1}$ (i.e., 16) is greater the value of the coding change vector $V_{C1}$ (i.e., 15), and the result of decision 138 is YES. Thus, the encoding portion 10 of the system 2 uses the reference vector table 26 and the coding vector table 28 to easily determine the location of changing elements. The encoding system 10 does not have to analyze the raw data each time that the reference changing element is relocated to a new position on the coding line as is done in the prior art.

Figure 3E:
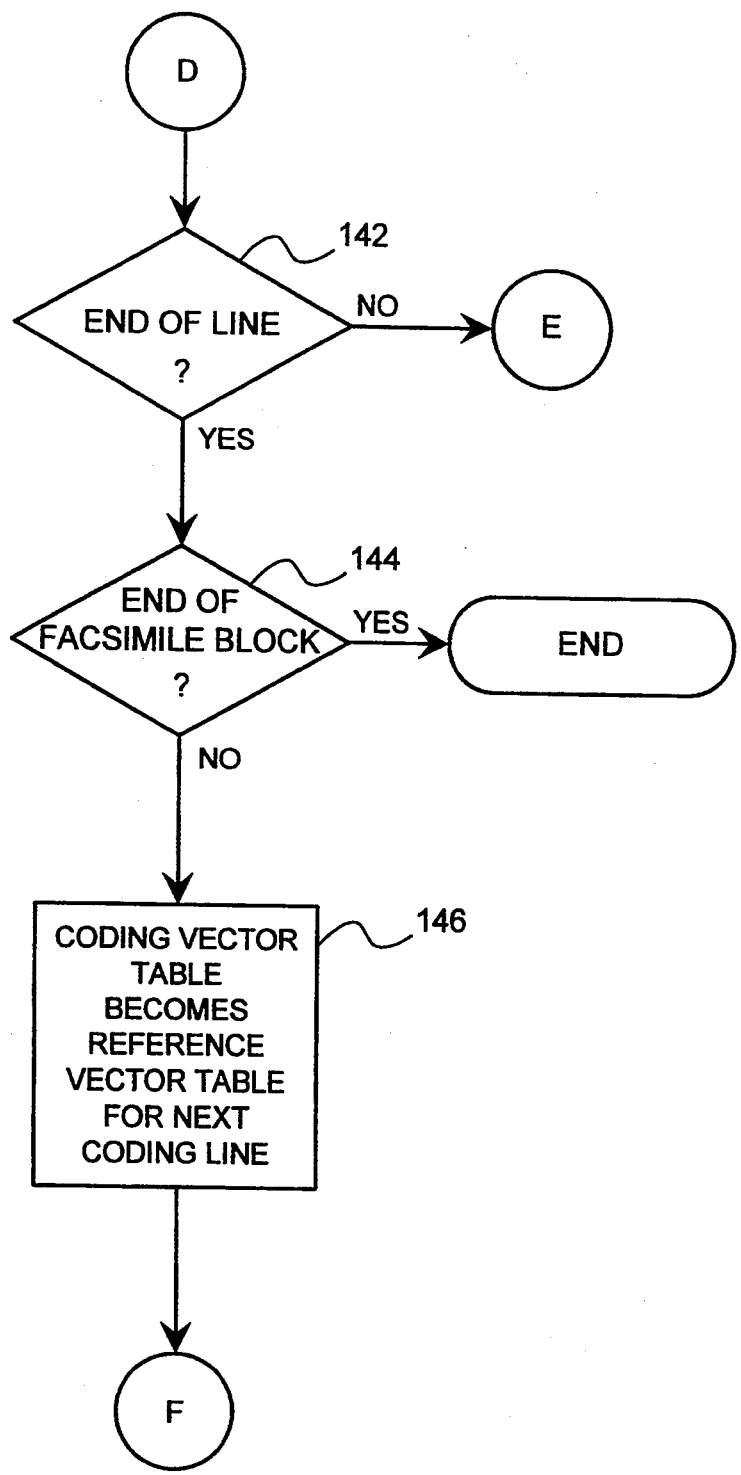

Following the completion of a horizontal mode coding pass, with a YES result in decision 128, or the completion of a vertical coding mode pass with a YES result in decision 138, the encoding portion 10 in decision 142, shown in FIG. 3E, determines whether it is at the end of a coding line. If it is not at the end of the coding line, the result of decision 142 is NO and the encoding portion 10 returns to decision 112 shown in FIG. 3B. If it is the end of the coding line, the result of decision 142 is YES, and in decision 144, the encoding portion 10 determines whether the coding line was the end of a facsimile block. If the coding line just coded is the end of a facsimile block, the result of decision 144 is YES and the encoding for the particular page is completed. It should be noted that the transmitting FAX machine may send additional data such as an end of facsimile block data frame. The additional data is described in the CCITT standard and is not discussed herein. If the coding line just encoded is not the end of the facsimile block, the result of decision 144 is NO. In that event, the encoding portion 10 uses the coding vector table 28 as the reference vector table 26 for the next coding line in step 146. This may easily be done by redesignating the coding index 32 as the reference index 30. Following step 146, the system returns to step 102 shown in FIG. 3A to determine change vectors for the new coding line.

Figure 8:
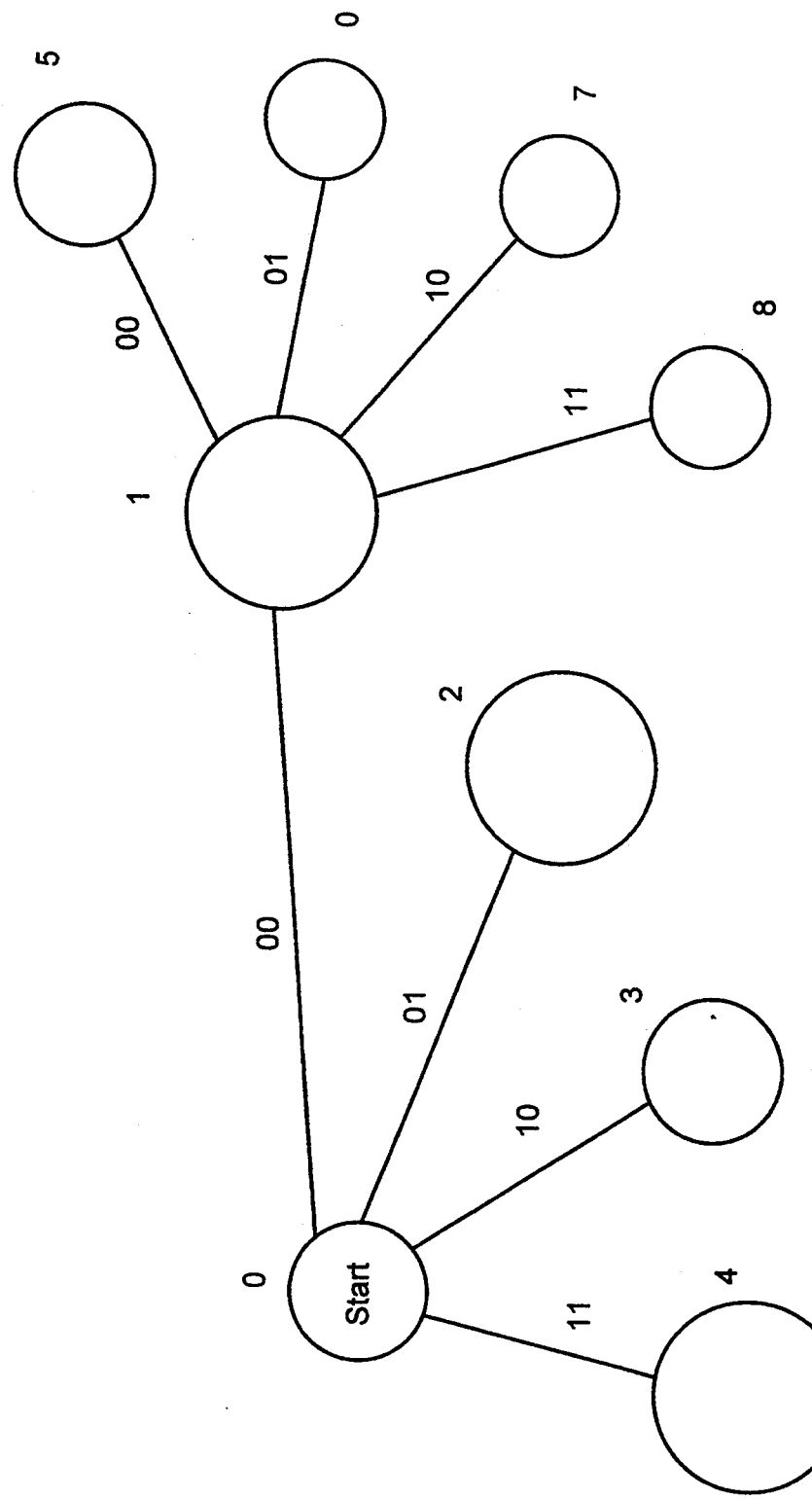
FIG. 8 illustrates the state machine of the decoding portion of the system of FIG. 2.

The decoding portion 44 (see FIG. 2) of the system 2 uses change vectors to decode data received from another FAX machine of the prior art or from a FAX machine of the same design. The decoding portion 44 is also used when interconverting from one data encoding format to another. As previously stated, the encoded data is stored in the compressed data file storage area 36 or in the memory 14. The decoding analyzer 46 analyzes the encoded data two bits at a time and uses the two bits to change positions in a state machine. The use of a state machine is well known in the art and will only be described briefly. As seen in FIG. 8, the decoding portion begins decoding at state 0. If the first two data bits are 00, the state machine changes to state 1. If the first two bits are 01, 10, or 11, the state machine changes to states 2, 3, and 4, respectively. The decoding analyzer 46 uses the decoding data table 48 to determine the next state in the state machine based on the current state and the two data bits currently being analyzed. The decoding analyzer 46 also uses the decoding data table 46 to determine if the current state of the state machine and the two data bits currently being analyzed correspond to a recognizable data pattern. The decoding analyzer 46 continues to analyze two bits at a time, and change states in the state machine, until the decoding analyzer 46 recognizes a data pattern that corresponds to a CCITT standard code (e.g., pass mode, vertical mode, or horizontal mode)for the particular data encoding format (i.e., MH, MR, or MMR).

When the decoding analyzer 46 recognizes a particular data pattern, it generates change vectors corresponding to that particular data pattern. For example, if the decoding analyzer 46 recognizes a data pattern corresponding to the vertical coding mode, the decoding analyzer can generate change vectors based on its current position in the reference and coding horizontal scan lines. Examples of the decoding process are provided below. When the data values in the decoding data table 48 correspond to a recognizable data pattern, the state of the state machine is reset to state 0, and the decoding analyzer 46 retrieves the next two encoded data bits. It should be noted that there are several codes, such as end of line (EOL) or end of message (EOM) commands, that are recognized by the decoding analyzer 46. All of these codes may not be present in all data encoding formats. For example, MMR data encoding format does not use an EOL command. Rather, the system 2 must keep track of the current position on each horizontal scan line.

As an example of the state machine in FIG. 8, consider the state transition data table in FIG. 9 and the action data table in FIG. 10 used with MMR encoding. The present state and the two data bits retrieved by the decoding analyzer 46 provide indexes to the next state in the state transition table of FIG. 9 and to the specific action to be taken as indicated by the action data table in FIG. 10. As previously indicated, the state machine is initially in state 0. The two data bits provide four possible data combinations (i.e., 00, 01, 10, and 11). If the first two data bits are 00, for example, the state transition table indicates that the state machine switches to state 1. The null value in the action data table indicates that there is no action to be taken at this point because no data code has been recognized. Therefore, the decoding analyzer 46 will retrieve two more data bits of encoded data from the compressed data file storage area 36 (see FIG. 2). If the next two data bits are 01, for example, the state transition table and the action table have index values of state 1, which is the present state, and 01 for the two current data bits. The value in the state transition table indicates that the next state is state 0, indicating that the state machine is returning to its initial state. The value in the action table indicates that the pass mode has been detected. Note that the CCITT data value for the pass mode is binary 0001. The decoding analyzer 46 uses the state transition table and the action table to decode the encoded data stored in the compressed data file storage area 36.

As another example, consider that the first two data bits of the encoded data are 10. The state transition table indicates that the next state is state 3, and the action data table indicates that no action is to be taken. It, the next two data bits are 11, the state transition table indicates that the next state is state 0, and the action table indicates that two separate coding modes have been recognized. The first coding mode is $V_0$ (binary code 1) and $V_{R1}$ (binary code 011). Thus, the decoding analyzer 46 will take action on both decoded coding modes.

There may also be situations where the decoding analyzer 46 will know that a particular mode is being decoded, but must wait for more information to know precisely what actions to take. For example, if the decoding analyzer 46 retrieves data bits 00 from the compressed data file storage area 36, the state transition table indicates that the next state is state 1, and the action data table indicates that no action is to be taken at this time. If the next two data bits retrieved by the decoding analyzer 46 are 10, the decoding analyzer may recognize that the horizontal coding mode (binary code 001) has been detected, but there is not yet sufficient information available to take action. Therefore, the decoding analyzer 46 will continue to retrieve data bits until the entire horizontal mode coding has been recognized.

There are also situations in which a particular coding mode has been recognized and there are still additional encoded data bits that must be analyzed in the next decoding cycle. For example, if the first two data bits retrieved by the decoding analyzer 46 are 01, the next state is state 2, as indicated by the state transition data table of FIG. 9, and no action is to be taken. as indicated by the null entry in the action data table of FIG. 10. If the next two data bits retrieved by the decoding analyzer 46 are 00, the next state is state 0, as indicated by the entry in the state transition data table, and the entry in the action data table of FIG. 10 indicates that $V_{L1}$ coding mode (binary code 010) has been detected. Note that four data bits (0100) have been retrieved by the decoding analyzer 46, but only the first three data bits (010) are recognized as part of the binary code for the $V_{L1}$ coding mode. The trailing data bit (binary 0) must be retained as the first data bit when using the state transition data table of FIG. 9 and the action data table of FIG. 10 to determine the next state and action. For example, if the next two data bits retrieved by the decoding analyzer 46 are 11, state transition data table of FIG. 9 and the action data table of FIG. 10 will use 01 as the data bit values. The leading 0 data bit remains from the previous decoding cycle, and the trailing 1 data bit is the first of the two data bits retrieved by the decoding analyzer 46. In this manner, no data bits are lost when the decoding analyzer 46 completes a decoding cycle.

The above examples use separate tables for the state transition data table and the action data table to simplify, the understanding of the present invention. One can readily recognize that these two data tables can be combined into a single table containing two data values for each location. One data value would correspond to the next state in the state machine, while the second data value would correspond to the action, if any, to be taken by the decoding analyzer 46.

The above description provides an example of decoding MMR data. It can be appreciated that the principles of the present invention can be readily applied to other data encoding formats such as MH and MR. The only difference is the decoding data table 48 is different for each data encoding format. The system 2 provides a different decoding data table 48 for each of the data encoding formats. The type of data encoding format is indicated by a transmitting FAX machine in the negotiation phase (phase B in FIG. 1) prior to the transmission of the facsimile message data.

As each of the standard coding modes is detected, the decoding portion 44 generates change vectors indicative of the coding mode. For example, if MMR encoding is used, the decoding portion 44 uses a reference horizontal scan line and a coding scan line, as previously discussed in connection with the coding portion 10. The first reference line is an imaginary all-white line at the top of each page of the facsimile message. The first horizontal scan line of the facsimile message is designated as the coding line. The processed coding line then becomes the reference line for the next adjacent horizontal scan line. The process is repeated for each page of a facsimile message, so that a processed coding line becomes the reference line for the next adjacent horizontal scan line. In addition, the starting changing element of each horizontal scan line is an imaginary white pixel.

The decoding analyzer 46 processes each encoded horizontal scan line using the decoding data table 48, as described above. The decoding analyzer 46 uses the reference change vectors in the reference vector table 26 (see FIG. 2) to determine the coding change vectors. For example, if the decoding analyzer 46 detects a $V_R(3)$ coding mode (binary code 0000011), this indicates that the next coding change vector is one location to the right of the location indicated by the reference index 30. Using the data of Table 4, the data for the reference vector table 26 is already known. Similarly, the change vector in the location of the coding vector table 28 pointed to by the coding index 32 would also be known from the previous decoding cycle. In the example presented in Table 4, REFINDEX points to a location in the reference vector table 26 containing the value 12. The coding index 32, designated as CODINDEX in Table 4, points to a location in the coding vector table 28 containing the value 10. If the decoding analyzer 46 detects the $V_R(3)$ coding mode (binary code 0000011), it indicates that the next coding change vector is three pixels to the right of the pixel indicated by REFINDEX. The decoding analyzer will add three to the value contained in the reference vector table 26 at the location indicated by REFINDEX. Thus, the decoding analyzer will add 12+3 to determine the next value (15) in the coding vector table 28. The CODINDEX is also changed to point at the new location in the coding vector table 28. As can be readily seen, the process of generating change vectors from the decoded data is essentially the reverse of the process described in the flowcharts of FIGS. 3A to 3E.

Figure 11:
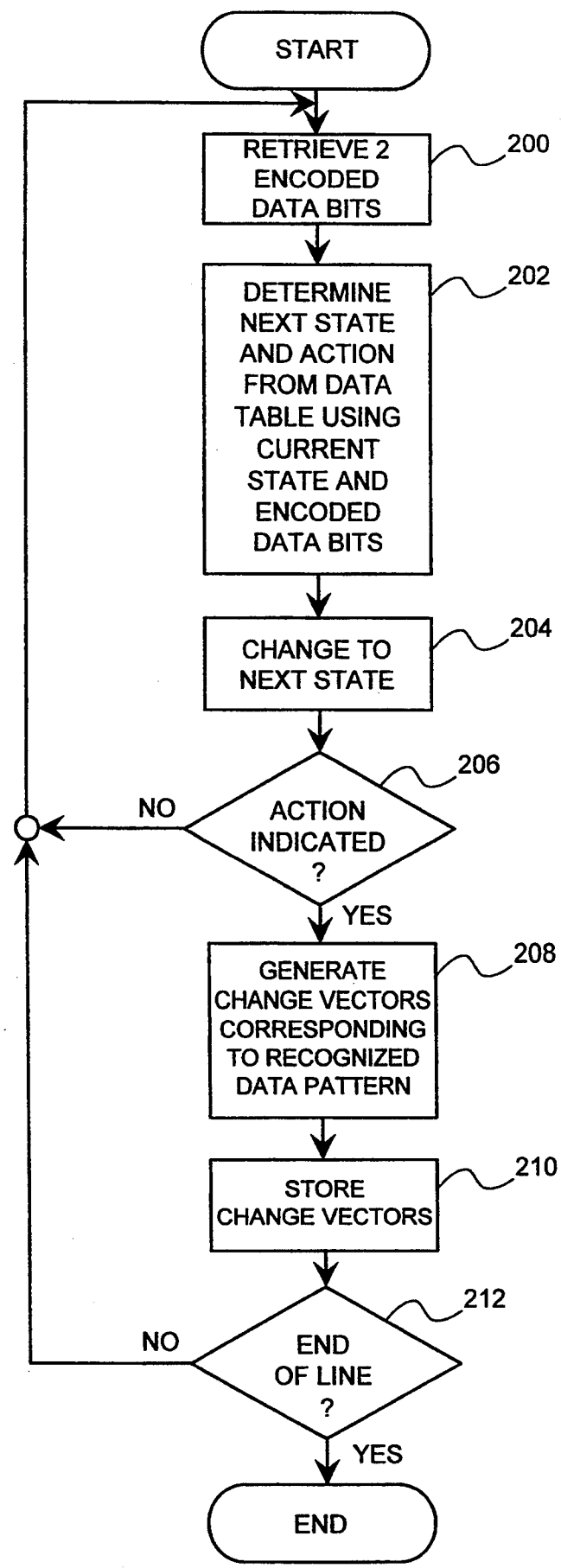
FIG. 11 is a flow chart of the decoding portion of the system of FIG. 2.

The entire decoding operation is best illustrated in FIG. 11 where the decoding analyzer 46 retrieves two bits of encoded data in step 200. In step 202, the decoding analyzer examines the decoding data table 48 using the current state of the state machine and the two encoded data bits retrieved in step 200 as indexes to the decoding table. Data entries within the decoding table 48 indicate what action, if any, must be taken based on the current state and the two data bits retrieved in step 200. In addition, the decoding analyzer determines the next state of the state machine based on the current state and the two encoded data bits retrieved in step 200. In step 208, the decoding analyzer changes the state of the state machine to the state indicated within the decoding data table 48. In decision 206, the decoding portion 44 determines whether any action has been indicated in the decoding data table 48 in step 202. If no action was indicated, the results of decision 206 is NO and the decoding portion 44 returns to step 200 to retrieve the next two encoded data bits. If an action was indicated by the decoding data table 48, the result of decision 206 is YES and in step 208, the decoding analyzer 46 generates change vectors corresponding to the recognized data pattern. In step 210, the decoding analyzer 46 stores the change vectors in the decoded data storage area 50. In decision 212, the decoding portion determines whether the end of a horizontal scan line has been reached. If the end of the line has not been reached, the result of decision 212 is NO and the decoding portion 44 returns to step 200 to retrieve the next two encoded data bits. If the decoding portion 44 has reached the end of the line, the result of decision 212 is YES and the decoding portion ends the decoding. As previously noted, some facsimile encoding standards have an explicit end of line command which is detected by the decoding analyzer 46 in the decoding data table 48. In other facsimile encoding formats, there is no explicit end of line instruction, and the decoding analyzer 46 must keep track of the current location on each horizontal scan line.

When the encoded data has been decoded into change vectors by the decoding portion 44, the change vectors may be used to generate pixel data to print the facsimile message on the print engine 18 (see FIG. 2). The process of generating pixel data from the change vectors is easily performed. By definition, the imaginary pixel at the start of each horizontal scan line is a white pixel. The change vectors indicate the locations on the horizontal scan line where the pixels change logic states. Thus, the change vectors indicate the changes in color from white to black and black to white.

The system 2 also permits the interconversion from one data encoding format, such as MMR, to another data encoding format, such as MH, without having to return the data to the raw data format. The decoding portion 44 of the system 2 decodes the data to generate change vectors as described above. The change vectors are then used by the encoding portion 10 to encode the data in the desired data encoding format, as previously described. The system 2 does not regenerate raw data to interconvert between data encoding formats. In contrast, prior art systems cannot directly interconvert from one data encoding format to another. The prior art systems must convert the encoded data into raw data and then convert the raw data into the desired new encoded format.

The ability to interconvert from one data encoding format directly to another data encoding format allows the transmitting FAX machine using the encoding portion 10 to encode the raw data before the facsimile telephone call is initiated. The transmitting FAX machine may assume that the receiving FAX machine can accept two dimensional T.6 (MMR) encoded data. Thus, the data is encoded before the costs for the facsimile telephone call begin to accrue. In the event that the assumption is incorrect, the transmitting FAX machine uses the change vectors to convert from the MMR format to the format required by the receiving FAX machine. The time to interconvert between data encoding formats using the system 2 is substantially less than the time required by the prior art to convert the MMR encoded data to raw data and back to the encoding format required by the receiving FAX machine. If the prior art system does not encode data before the facsimile telephone call is initiated, as is common in the prior art, the prior art transmitting FAX machine must convert the raw data to the desired data encoding format. This conversion time is slightly greater than the time required by the system 2 to interconvert from one data encoding format to another.

Table 5 presents encoding times using the change vectors of the present invention. These encoding times were made using CCITT standard pages for text data and complex data. The measurements were taken on an Intel 80386 processor running at a clock speed of 16 megahertz.

TABLE 5
CODE CONVERSION TIMES (SECONDS)

| Input | Format | Output Format | | |
|---|---|---|---|---|
| | | Raw | MH | MMR |
| Text | Raw | — | 1.9 | 2.6 |
| | MH | 1.7 | — | 2.9 |
| | MMR | 2.0 | 2.5 | — |
| Complex | Raw | — | 10.3 | 15.7 |
| | MH | 8.2 | — | 18.2 |
| | MMR | 9.9 | 14.1 | — |

While no encoding times are available for prior an systems, the increased computational efficiency provided by the system 2 is believed to provide somewhat faster encoding times than the prior art. Even if one assumes that the prior art encoding times are substantially similar to the encoding times shown in Table 5, the system 2 offers the potential for a significant savings in encoding times because of the ability to interconvert directly from one data encoding fore, at to another.

As seen in Table 5, the system 2 encodes a complex page of raw data into MMR encoded data in 15.7 seconds. As discussed above, the system 10 in the transmitting FAX machine could perform this encoding before the facsimile telephone call is initiated. If the receiving FAX machine has MMR encoding capability, there is no additional encoding time required by the system 2 in the transmitting FAX machine while the facsimile telephone call is in progress. In contrast, the prior art transmitting FAX machine requires 15.7 seconds, during the facsimile telephone call, to encode raw data into MMR encoded data. Thus, the system 2 offers a potential savings of 15.7 seconds per page of complex data. If the receiving FAX machine can only encode MH data, the system 2 can interconvert from MMR data to MH data in 14.1 seconds. The interconversion, which is performed during the facsimile telephone call, requires slightly more time than it would take the transmitting FAX machine of the prior art to encode a complex page of raw data to an MH format. However, many FAX machines today have MMR encoding capability. Thus, the system 2 can encode the raw data into MMR encoded data before the facsimile telephone call is initiated and potentially save significant amounts of encoding time during the facsimile telephone call. Prior art transmitting FAX machines could also encode raw data into a predetermined format, such as MMR encoding, but the time required to interconvert from one data encoding format to another during a facsimile telephone call is significant. The time required to convert from a first data encoding format to a second data encoding format using the prior art system may be calculated by adding the conversion time from the first data encoding format to the raw data format plus the conversion time from the raw data format to the second data encoding format. For example, the conversion of complex data from MMR data encoding format to MH data encoding format using the prior art approach requires the conversion from MMR data encoding format to raw data format (9.9 seconds) plus the conversion time from the raw data format to MH data encoding format (10.3 seconds) for a total interconversion time of 20.2 seconds. In contrast, the system 12 can convert directly from the MMR data encoding format to MH data encoding format using change vectors with a total interconversion time of 14.1 seconds. Thus, it can readily seen that the principles of the present invention permit greater computational efficiency over the prior art. This increased computational efficiency results in cost savings because the duration of the facsimile telephone call is decreased.

While the examples presented above relate to the two dimensional coding specified in T.6 portion of the CCITT standard, the system 12 can also encode to the one dimensional coding or two dimensional coding specified in T.4 portion of the CCITT standard. The flow chart for two dimensional coding under the T.4 encoding standard is quite similar to the two dimensional coding under the T.6 encoding standard, except that there are portions of the raw data that are encoded in only one dimension. If the transmitting FAX machine is encoding the raw data using the two dimensional T.4 encoding standard one line is encoded using one dimensional encoding followed by either one line or three lines of two dimensional encoding, depending on the resolution of the FAX machine.

One dimensional encoding under the T.4 encoding standard uses the CCITT standard codes indicating the lengths of white runs and black runs on the coding line.

While the improvement in performance using the system 12 for one dimensional encoding is less dramatic, there is still an improvement in computational efficiency because the system 12 has determined the change vectors before the analysis of the coding line begins.

The prior art data encoding system encodes raw data in a manner that require several registers to store byte pointers, and bit pointers for both the raw data and the encoded data. A typical microprocessor has a limited number of internal registers available for such data processing. Therefore, the data encoding systems of the prior art generally need to use memory to store the various pointers. This is computationally inefficient because the access time for memory is substantially greater than access time for an internal register.

In contrast, the system 12 permits the efficient use of internal registers by using word oriented data structures for the change vector storage tables 26 and 28 that does not required byte or bit pointers. Once the raw data is analyzed and the change vector data created for the reference and coding horizontal scan lines, the raw data can be discarded, and the internal registers used for byte and bit pointers for the raw data can be used for byte and bit pointers for the encoded data. Thus, the system 12 makes efficient use of computing capability of the microprocessor and provides greater computational efficiency for the encoding and decoding process.

In addition, the system 12 provides even greater computational efficiency when encoding raw data in a two dimensional standard encoding format. The system 12 analyzes a horizontal scan line a single time and generates the change vectors for that horizontal scan line. Because the coding scan line becomes the reference scan line for the next horizontal scan line, the same change vector data can be used two times without requiring the analysis of the raw data a second time. In contrast, the prior art systems require that the raw data for each horizontal scan line be analyzed a first time when the horizontal scan line is the coding scan line and a second time when the horizontal scan line is the reference scan line.

It should also be appreciated that the change vector tables may be used in a manner other than that described above. For example, the values in the change vector tables could be entered from the bottom up with the system decrementing the respective indexes to point to the next subsequent change vector.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for encoding facsimile data in a first facsimile machine for transmission from the first facsimile machine to a second facsimile machine, comprising:

a data file storage area containing a raw data file to be encoded according to a predetermined standard encoding format, said raw data file comprising a series of horizontal scan lines each having first and second ends, each of said horizontal scan lines comprising a plurality of pixels having first and second logic states;

a generator analyzing said horizontal scan lines and generating position data indicative of positions on said horizontal scan lines relative to said first end where said pixels change from said first logic state to said second logic state and from said second logic state to said first logic state;

a reference storage table coupled to said generator and receiving said position data for a single one of said horizontal scan lines designated as a reference scan line;

a reference index pointing to a location within said reference table;

a coding storage table coupled to said generator and receiving said position data for a single one of said horizontal scan lines adjacent to said reference line and designated as a coding scan line;

a coding index pointing to a location within said coding table;

an analyzer analyzing said reference scan line and said coding scan line by analyzing said position data in said reference table and said coding table, said analyzer generating compressed data for said coding scan line using a plurality of standard predetermined codes to encode said coding scan line according to said predetermined standard encoding format;

a compressed data file storage area receiving said compressed data and temporarily storing said compressed data; and a facsimile interface sequentially receiving said stored compressed data from said compressed data file storage area and generating standard predetermined electrical signals representative of said compressed data.

2. The system of claim 1 wherein said predetermined encoding standard format is defined by one of CCITT standards comprising recommendation T.6 two dimensional facsimile encoding standard, recommendation T.4 two dimensional facsimile encoding standard, and recommendation T.4 one dimensional facsimile encoding standard.

3. The system of claim 1 wherein said facsimile interface generates a plurality of standard predetermined audio signals representative of said compressed data and couples said audio signals to a telephone line for transmission over said telephone line to the second facsimile machine.

4. The system of claim 1 wherein said analyzer initializes said coding index to point to a first location within said coding table and initially defines first, second, and third coding change vectors having values contained within first, second, and third locations in said coding table.

5. The system of claim 4 wherein said first, second, and third locations in said coding table are locations pointed to by said coding index, said coding index plus one, and said coding index plus two, respectively.

6. The system of claim 4 wherein said analyzer initializes said reference index to point to a first location within said reference table and initially defines first and second reference change vectors having values contained within first and second locations in said reference table.

7. The system of claim 6 wherein said first and second locations in said reference table are locations pointed to by said reference index and said reference index plus one, respectively.

8. The system of claim 6 wherein said analyzer redefines said first coding vector as having said second reference vector value if said analyzer determines that said value of said second reference vector is less than said value of said second coding vector, said analyzer further altering said reference index from a present location in said reference table to a new location in said reference table two locations from said present location and redefining said first and second reference change vectors having values contained within said reference vector table at said new location, and a first location next to said new location, respectively.

9. The system of claim 8 wherein said analyzer increments said reference index by two to point to said location in said reference table two locations from said present location and redefines said first and second reference change vectors by assigning values contained within said reference vector table at locations pointed to by said reference index, and said reference index plus one.

10. The system of claim 6 wherein said analyzer alters said coding index from a present location in said coding table to a new location in said coding table two locations from said present location and redefines said first, second, and third coding change vectors having values contained within said coding table at said new location pointed to by said coding index, a first location in said coding table next to said new location, and a second location in said coding table next to said first location, said analyzer further altering said reference index from a present location in said reference table to a new location in said reference table two locations from said present location until the value contained in said reference table at said new location is greater than the value of said first coding vector and redefining said first and second reference change vectors having values contained within said reference vector table at said new location and a first location in said reference table following said new location.

11. The system of claim 10 wherein said analyzer alters said coding index by incrementing said coding index by two, and redefines said coding change vectors by assigning the value contained in said coding vector table at locations pointed to by said coding index, said coding index plus one, and said coding index plus two, respectively, said analyzer further altering said reference index by incrementing said reference index by two, said analyzer redefining said first and second reference change vectors having values contained within said reference table at locations pointed to by said reference index, and said reference index plus one.

12. The system of claim 6 wherein said analyzer alters said coding index from a present location in said coding table to a new location in said coding table two locations from said present location and redefines said first, second, and third coding change vectors having values contained within said coding table at said new location, a first location in said coding table next to said new location, and a second location in said coding table next to said first location if said analyzer determines that the value of said second coding change vector is within three of the value of said first reference change vector, said analyzer also altering said reference index from a present location in said reference table to a next previous location in said reference table and determining if the value contained in said reference table at said next previous location indicated by said reference index is greater than the value of said first coding vector, and if the value contained in said reference table at the location indicated by said reference index is not greater than the value of said first coding vector, altering said reference index from said next previous location to a new location in said reference table two locations from said next previous location until the value contained in said reference table at said new location is greater than the value of said first coding vector and redefining said first and second reference change vectors having values contained within said reference vector table at said location and a first location in said reference table next to said new location.

13. The system of claim 12 wherein said analyzer alters said coding index by incrementing said coding index by one and redefines said first, second, and third coding change vectors by assigning values contained within said coding vector table at locations pointed to by said coding index, said coding index plus one, and said coding index plus two, respectively, said analyzer altering said reference index by decrementing said reference index by one and determining if the value contained in said reference vector table at the location indicated by said reference index is greater than the value of said first coding vector, and if the value contained in said reference vector table at the location indicated by said reference index is not greater than the value of said first coding vector, said analyzer further incrementing said reference vector by two until the value contained in said reference vector table at the location indicated by said reference index is greater than the value of said first coding vector, said analyzer redefining said first and second reference change vectors having values contained within said reference vector table at locations pointed to by said reference index, and said reference index plus one.

14. A system for encoding facsimile data in a first facsimile machine for transmission from the first facsimile machine to a second facsimile machine, comprising:
 a data file storage area containing a raw data file to be encoded according to a predetermined standard encoding format, said raw data file comprising a series of horizontal scan lines each having first and second ends, each of said horizontal scan lines comprising a plurality of pixels having first and second logic states;
 a generator analyzing said horizontal scan lines and generating position data indicative of positions on said horizontal scan lines relative to said first end where said pixels change from said first logic state to said second logic state and from said second logic state to said first logic state;
 a storage table coupled to said generator and receiving said position data for a single one of said horizontal scan lines;
 an analyzer analyzing said one scan line by analyzing said position data in said table, said analyzer generating compressed data for said one scan line using a plurality of standard predetermined codes to encode said one scan line according to said predetermined standard encoding format;
 a compressed data file storage area receiving said compressed data and temporarily storing said compressed data; and
 a facsimile interface sequentially receiving said stored compressed data from said compressed data file storage area and generating standard predetermined electrical signals representative of said compressed data.

15. The system of claim 14, further including conversion means for converting said compressed data in said predetermined standard encoding format to a second predetermined standard encoding format.

16. The system of claim 14 wherein said predetermined encoding standard format is defined by one of CCITT standards comprising recommendation T.6 two dimensional facsimile encoding standard recommendation T.4 two dimensional facsimile encoding standard, and recommendation T.4 one dimensional facsimile encoding standard.

17. The system of claim 14 wherein said plurality of predetermined standard encoding formats comprise MI t encoding, MR encoding, and MMR encoding.

18. The system of claim 14 wherein said facsimile interface generates a plurality of standard predetermined audio signals representative of said compressed data and couples said audio signals to a telephone line for transmission over said telephone line to the second facsimile machine.

19. A system for decoding facsimile data previously encoded according to a predetermined standard format, the decoded facsimile data comprising a series of horizontal scan lines, each of the horizontal scan lines comprising a plurality of pixels having first and second logic states, the system comprising:
   an encoded data storage area containing the encoded facsimile data;
   means for retrieving a portion of the encoded data from said encoded data storage area for analysis;
   a state transition table having a first index indicating a current decoding position and a second index having values corresponding to said portion of the encoded data, said state transition table containing data values indicating a next decoding position;
   an action data table having said first index and said second index, said action data table containing data values indicating a decoding action to be performed;
   an analyzer receiving said encoded data portion and using said state transition table to determine said next machine state, said analyzer using said action table to determine said decoding action, said analyzer generating a plurality of change vectors indicating positions the horizontal scan lines where the pixels change :from the first logic state to the second logic state and from the second logic state to the first logic state; and a change vector data storage area containing said change vectors for each of the horizontal scan lines.

20. The system of claim 19, further including a data generator receiving said change vectors for each of the horizontal scan lines and generating pixel data indicating the logic state for each of the plurality of pixels on each of the horizontal scan lines.

21. The system of claim 20, further including a print engine receiving said pixel data and generating a printed page containing the horizontal scan lines.

22. The system of claim 19 wherein said portion of the encoded data comprises two data bits.

23. The system of claim 19 wherein the predetermined standard format is defined by one of CCITT standards comprising recommendation T.6 two dimensional facsimile encoding standard, recommendation T.4 two dimensional facsimile encoding standard, and recommendation T.4 one dimensional facsimile encoding standard.

24. A system for decoding facsimile data previously encoded according to a predetermined standard format, the decoded facsimile data comprising a series of horizontal scan lines, each of the horizontal scan lines comprising a plurality of pixels having first and second logic states, the system comprising:
   an encoded data storage area containing the encoded facsimile data;
   means for retrieving a portion of the encoded data from said encoded data storage area for analysis;
   a data table having a first index indicating a current decoding position and a second index having values corresponding to said portion of the encoded data, said data table containing data values indicating a next decoding position and a decoding action to be performed;
   an analyzer receiving said encoded data portion and using said data table to determine said next decoding position and said decoding action, said analyzer generating a plurality of change vectors indicating positions on the horizontal scan lines where the pixels change from the first logic state to the second logic state and from the second logic state to the first logic state; and
   a change vector data storage area containing said change vectors for the horizontal scan lines.

25. The system of claim 24 wherein the predetermined standard format is defined by one of CCITT standards comprising recommendation T.6 two dimensional facsimile encoding standard recommendation T.4 two dimensional facsimile encoding standard, and recommendation T.4 one dimensional facsimile encoding standard.

26. A system for converting facsimile data previously encoded according to a first predetermined standard format to a second predetermined standard format, the facsimile data representing a series of horizontal scan lines, each of the horizontal scan lines comprising a plurality of pixels having first and second logic states, the system comprising:
   a first encoded data storage area containing the facsimile data encoded according to the first predetermined standard format;
   means for retrieving a portion of the facsimile data encoded according to the first predetermined standard format from said first encoded data storage area for analysis;
   a data table having a first index indicating a current decoding position and a second index having values corresponding to said portion of the facsimile data encoded according to the first predetermined standard format, said data table containing data values indicating a next decoding position and a decoding action to be performed;
   a decoding analyzer receiving said portion of the encoded data and using said data table to determine said next decoding position and said decoding action, said analyzer generating a plurality of change vectors indicating positions on the horizontal scan lines where the pixels change from the first logic state to the second logic state and from the second logic state to the first logic state;
   a storage table receiving said change vectors for the horizontal scan lines; and
   an encoding analyzer analyzing the horizontal scan lines by analyzing entries in said storage table, said encoding analyzer generating data representing the horizontal scan lines using a plurality of standard predetermined codes encoded according to the second predetermined standard format.

27. The system of claim 26 wherein the first and second predetermined standard formats are defined by two of the CCITT standards comprising recommendation T.6 two dimensional facsimile encoding standard, recommendation T.4 two dimensional facsimile encoding standard, and recommendation T.4 one dimensional facsimile encoding standard.

28. A method for use in a facsimile machine for two dimensional encoding of raw data into facsimile data encoded to control to a predetermined standard, the raw data comprising a series of horizontal lines of data having first and second ends, each of said horizontal lines comprising a series of horizontal pixels having first and second logic states corresponding to white and black pixels, respectively, the method comprising the steps of:
  (a) selecting one of the horizontal lines of data as a reference line;
  (b) determining a set of reference change vectors for said reference line, each of said reference vectors having a position value indicating the position on said reference line relative to the first end of said reference line at which the horizontal pixels change logic states from the first to second logic state and from the second to first logic state;
  (c) storing said set of reference vector values in a reference table, said reference table having a reference pointer indicating a position within said reference table;
  (d) determining a set of coding change vectors for a coding line, said coding line being the horizontal line of data adjacent said reference line, each of said coding vectors having a position value indicating the position on said coding line relative to the first end of said coding line where the horizontal pixels changes logic states from the first to second logic state and from the second to first logic state;
  (e) storing said set of coding vector values in a coding table, said coding table having a coding pointer indicating a position within said coding table;
  (f) comparing the value of said second reference vector to the value of said second coding vector to determine if the value of said second reference vector is less than the value of said second coding vector;
  (g) if the value of said second reference vector is less the value of said second coding vector:
    (1) inserting a predetermined code for a pass mode in a coded data storage area;
    (2) assigning the value of said second reference vector to said first coding vector;
    (3) assigning to said second and third coding vectors the values of the next two coding vectors;
    (4) incrementing said reference index by two until the value of said first reference vector pointed to by said reference index is greater than the value of said first coding vector; and
    (5) assigning to said second reference vector the value in said reference coding table at the next subsequent location to said reference index;
  (h) if the value of said second reference vector is not less the value of said second coding vector, determining if the value of said first coding vector and the value of said first reference vector are within three of each other;
  (i) if the value of said first coding vector is within three of the value of said first reference vector:
    (1) inserting a predetermined code for a vertical mode in said coded data storage area, said predetermined code indicating the relative position of said first coding vector with respect to said first reference vector;
    (2) assigning the value of said third coding vector to said first coding vector;
    (3) assigning to said second and third coding vectors the values of the next two coding vectors in said coding table;
    (4) decrementing said reference index by a value of one and determining if the value of said reference table pointed to by said reference index is greater than the value of said first coding vector;
    (5) if the value of said reference table pointed to by said reference index is not greater than the value of said first coding vector, incrementing said reference index by two until the value of said reference table at the location pointed to by said reference index is greater than the value of said first coding vector; and
    (6) assigning to said second reference vector the value in said reference table at the next subsequent location to said reference index;
  (j) if the value of said first coding vector is not within three of the value of said first reference vector:
    (1) inserting a predetermined code for a horizontal mode in said coded data storage area, said predetermined code indicating the relative position of said first coding vector with respect to said second coding vector and the logic state of the pixels between said first and second coding vectors, and the relative position of said second coding vector with respect to said third coding vector and the logic state of the pixels between said second and third coding vectors;
    (2) assigning the value of said third coding vector to said first coding vector;
    (3) assigning to said second and third coding vectors the values of the next two locations in said coding table;
    (4) incrementing said reference index by two until the value of said reference table at the location pointed to by said reference index is greater than the value of said first coding vector; and
    (5) assigning to said second reference vector the value in said reference coding table at the next subsequent location to said reference index; and
  (k) repeating steps (f) to (j) for the entire coding line.

29. A method for use in a facsimile machine for encoding raw data into encoded facsimile data, the raw data comprising a series of horizontal lines of data having first and second ends, each of said horizontal lines comprising a series of pixels having first and second logic states corresponding to white and black pixels, respectively, the method comprising the steps of:
  (a) selecting one of a plurality of predetermined standard encoding formats, the raw data encoded to conform to said selected standard;
  (b) determining position data for one of the horizontal lines of data, said position data having position values indicative of the position on said one line relative to the first end of said one line at which the pixels change logic states from the first to second logic state and from the second to first logic state;
  (c) storing said position data in a table, said table having a pointer indicating a location, within said table;
  (d) using said table and said pointer to generate compressed data for said one line using of a plurality of standard data encoding modes required to encode at least a portion of said one line according to said one selected predetermined standard encoding format;

(e) storing said compressed data in a compressed data storage area; and (f) repeating steps (d)–(e) for the entire said one line.

30. The method of claim 29 wherein said plurality of standard encoding formats comprise MH, MR, and MMR data encoding formats.

31. The method of claim 29 where said plurality of standard encoding modes comprise pass mode, horizontal mode, and vertical mode.

32. The method of claim 29, further including the steps of:

initiating a facsimile telephone;

receiving in the facsimile machine, data from a receiving facsimile machine relating to ones of said plurality of standard encoding formats capable of being processed by said receiving facsimile machine, said step (a) selecting said one selected predetermined standard encoding format based on said received data.

33. The method of claim 29 wherein steps (d) to (f) encode the raw data into said one selected predetermined standard encoding format, the method further including the steps of:

initiating a facsimile telephone;

receiving in the facsimile machine, data from a receiving facsimile machine relating to ones of said plurality of standard encoding formats capable of being processed by said receiving facsimile machine;

converting said compressed data in said compressed data storage area from said one selected predetermined standard encoding format to another of said plurality of data encoding formats different from said one selected predetermined standard encoding format, said step of converting using said vector table and said pointer.

34. A method for use in a facsimile machine for encoding raw data into encoded facsimile data according to a predetermined standard encoding format, the raw data comprising a series of horizontal lines of data having first and second ends, each of said horizontal lines comprising a series of pixels having first and second logic states corresponding to white and black pixels, respectively, the method comprising the steps of:

(a) determining position data for one of the horizontal lines of data, said position data having position values indicative of the position on said one line relative to the first end of said one line at which the pixels change logic states from the first to second logic state and from the second to first logic state;

(b) storing said position data in a table, said table having a pointer indicating a location within said table;

(c) using said table and said pointer to generate compressed data for said one line using of a plurality of standard data encoding modes required to encode at least a portion of said one line according to the predetermined standard encoding format;

(d) storing said compressed data in a compressed data storage area; and (e) repeating steps (c)–(d) for the entire said one line.

35. The method of claim 34 wherein the predetermined encoding standard format is defined by one of CCITT standards comprising recommendation T.6 two dimensional facsimile encoding standard, recommendation T.4 two dimensional facsimile encoding standard, and recommendation T.4 one dimensional facsimile encoding standard.

36. A method for decoding facsimile data previously encoded according to a predetermined standard format, the decoded facsimile data comprising a series of horizontal scan lines, each of the horizontal scan lines comprising a plurality of pixels having first and second logic states, the method comprising the steps of:

(a) retrieving a portion of the encoded data for one of the horizontal scan lines from an encoded data storage area;

(b) analyzing said portion of the encoded data and using a data table having a first index indicating a current decoding position and a second index having values corresponding to said portion of the encoded data, said data table containing data values indicating a next decoding position and a decoding action to be performed;

(c) generating a plurality of change vectors indicating positions on said one horizontal scan line where the pixels change from the first logic state to the second logic state and from the second logic state to the first logic state;

(d) storing said change vectors for said one horizontal scan line in a change vector data storage area; and (e) repeating steps (a) to (d) for each of the series of horizontal scan lines.

37. The method of claim 36, further including the step of generating pixel data indicating the logic state for each of the plurality of pixels for each of the horizontal scan line using said change vectors.

38. The method of claim 36, further including the step of generating a printed page containing the horizontal scan lines on a print engine, said print engine using said pixel data.

39. The method of claim 36 wherein said portion of the encoded data comprises two data bits.

40. The method of claim 34 wherein the predetermined standard format is defined by one of CCITT standards comprising recommendation T.6 two dimensional facsimile encoding standard, recommendation T.4 two dimensional facsimile encoding standard, and recommendation T.4 one dimensional facsimile encoding standard.

41. A method for converting facsimile data representing a facsimile message comprising a series of horizontal scan lines, each of the horizontal scan lines comprising a plurality of pixels having first and second logic states, the facsimile data having been previously encoded according to a first predetermined standard format to a second predetermined standard format, the encoded facsimile data the method comprising:

(a) retrieving a portion of the encoded data for one of the horizontal scan lines from an encoded data storage area;

(b) analyzing said portion of the encoded data and using a data table having a first index indicating a current decoding position and, a second index having values corresponding to said portion of the encoded data, said data table containing data values indicating a next decoding position and a decoding action to be performed;

(c) generating a plurality of change vectors indicating positions on said one horizontal scan line where the pixels change from the first logic state to the second logic state and from the second logic state to the first logic state;

(d) storing said change vectors for said one horizontal scan line in a change vector data storage area;

(e) analyzing said one horizontal scan line using an encoding analyzer that analyzes entries in said change vector data storage area, said encoding analyzer generating data representing said one horizontal scan line using a plurality of standard predetermined codes encoded according to the second predetermined standard format; and (f) repeating steps (a) to (e) for each of the series of horizontal scan lines.

42. The method of claim 41 wherein the first and second predetermined standard formats are defined by two of CCITT standards comprising recommendation T.6 two dimensional facsimile encoding standard, recommendation T.4 two dimensional facsimile encoding standard, and recommendation T.4 one dimensional facsimile encoding standard.

* * * * *

UNITED STATES PATENT AND TRADEMARK OFFICE
CERTIFICATE OF CORRECTION

PATENT NO.    :   5,414,526
DATED         :   May 9, 1995
INVENTOR(S)   :   Steven J. Friedman It is certified that error appears in the above identified patent and that said Letters Patent is hereby corrected as shown below:

In column 23, claim 17, line 9, after "comprise", please delete "MI" and substitute therefor --MH--.

In column 23, claim 17, line 10, before "encoding" please delete "t".

Col. 23, claim 19, line 43, after "change" please delete ":".

In column 24, claim 25, line 26, after "standard" please insert --,--.

In column 25, claim 28, line 8, please delete "control" and substitute therefor --conform--.

Signed and Sealed this

Seventh Day of November, 1995

BRUCE LEHMAN

*Attest:*

*Attesting Officer*        *Commissioner of Patents and Trademarks*